United States Patent
Cheung et al.

(10) Patent No.: US 11,489,659 B2
(45) Date of Patent: Nov. 1, 2022

(54) MULTIPLE DATA SOURCE SECURE DATA PROCESSING

(71) Applicant: Via Science, Inc., Somerville, MA (US)

(72) Inventors: Kai Chung Cheung, Markham (CA);
Mathew Rogers, Montreal (CA);
Jeremy Taylor, Quebec (CA)

(73) Assignee: Via Science, Inc., Somerville, MA (US)

( * ) Notice: Subject to any disclaimer, the term of this patent is extended or adjusted under 35 U.S.C. 154(b) by 0 days.

(21) Appl. No.: 17/083,789

(22) Filed: Oct. 29, 2020

(65) Prior Publication Data

US 2021/0135837 A1    May 6, 2021

Related U.S. Application Data

(60) Provisional application No. 62/935,722, filed on Nov. 15, 2019, provisional application No. 62/927,908, filed on Oct. 30, 2019, provisional application No. 62/927,909, filed on Oct. 30, 2019.

(51) Int. Cl.
*H04L 9/08* (2006.01)
*H04L 9/30* (2006.01)
*H04L 9/00* (2022.01)

(52) U.S. Cl.
CPC ............ *H04L 9/008* (2013.01); *H04L 9/0825* (2013.01); *H04L 9/0869* (2013.01); *H04L 9/3066* (2013.01); *H04L 2209/046* (2013.01)

(58) Field of Classification Search
CPC ..... H04L 9/008; H04L 9/0825; H04L 9/0869; H04L 9/3066; H04L 2209/046; H04L 2209/46; H04L 9/08; H04L 9/30
See application file for complete search history.

(56) References Cited

U.S. PATENT DOCUMENTS

| | | | |
|---|---|---|---|
| 11,101,976 B2* | 8/2021 | Cheon | H04L 9/008 |
| 2013/0170640 A1 | 7/2013 | Gentry | |
| 2018/0349740 A1 | 12/2018 | Schneider et al. | |
| 2019/0164056 A1 | 5/2019 | Hoshizuki et al. | |
| 2019/0199509 A1 | 6/2019 | Hoshizuki et al. | |
| 2019/0363870 A1* | 11/2019 | Wagner | G06Q 20/401 |
| 2019/0386814 A1 | 12/2019 | Ahmed | |
| 2020/0004973 A1 | 1/2020 | Li et al. | |

(Continued)

FOREIGN PATENT DOCUMENTS

EP    3461054 A1 *    3/2019

OTHER PUBLICATIONS

U S. Office Action dated Aug. 19, 2021 in U.S. Appl. No. 17/329,270, filed May 25, 2021, 32 pages.

(Continued)

*Primary Examiner* — Quazi Farooqui
(74) *Attorney, Agent, or Firm* — Pierce Atwood LLP

(57) ABSTRACT

Multiple systems may determine neural-network output data and neural-network parameter data and may transmit the data therebetween to train and run the neural-network model to predict an event given input data. A data-provider system may perform a dot-product operation using encrypted data, and a secure-processing component may decrypt and process that data using an activation function to predict an event. Multiple secure-processing components may be used to perform a multiplication operation using homomorphic encrypted data.

20 Claims, 15 Drawing Sheets

(56) References Cited

U.S. PATENT DOCUMENTS

| | | | |
|---|---|---|---|
| 2020/0211004 A1* | 7/2020 | Ng | G06Q 20/40 |
| 2020/0228308 A1 | 7/2020 | Shainski et al. | |
| 2020/0280559 A1 | 9/2020 | Wu et al. | |
| 2020/0294056 A1 | 9/2020 | Patel et al. | |
| 2020/0313849 A1 | 10/2020 | Kar et al. | |
| 2020/0351082 A1 | 11/2020 | Wan | |
| 2021/0004718 A1 | 1/2021 | Ren et al. | |
| 2021/0058253 A1 | 2/2021 | Ma et al. | |
| 2021/0167972 A1* | 6/2021 | Zang | H04L 9/3247 |
| 2021/0192076 A1* | 6/2021 | Patel | G06F 21/602 |
| 2021/0232974 A1 | 7/2021 | Fan et al. | |

OTHER PUBLICATIONS

International Preliminary Report on Patentability issued in copending International Patent Application No. PCT/US2020/057898, dated May 12, 2022.

Billett, "International Search Report and Written Opinion," issued in International Application No. PCT/US2020/057898, dated Dec. 12, 2020, 9 pages.

Hallgren, et al., "BetterTimes," Nov. 28, 2015, via http://www.cse.chalmers.se/~andrei/provsec15.pdf, 19 pages.

Xue et al., "Distributed Large Scale Privacy-Preserving Deep Mining", 2018 IEEE Third International Conference on Data Science in Cyberspace, Jun. 18, 2018, 5 pages.

* cited by examiner

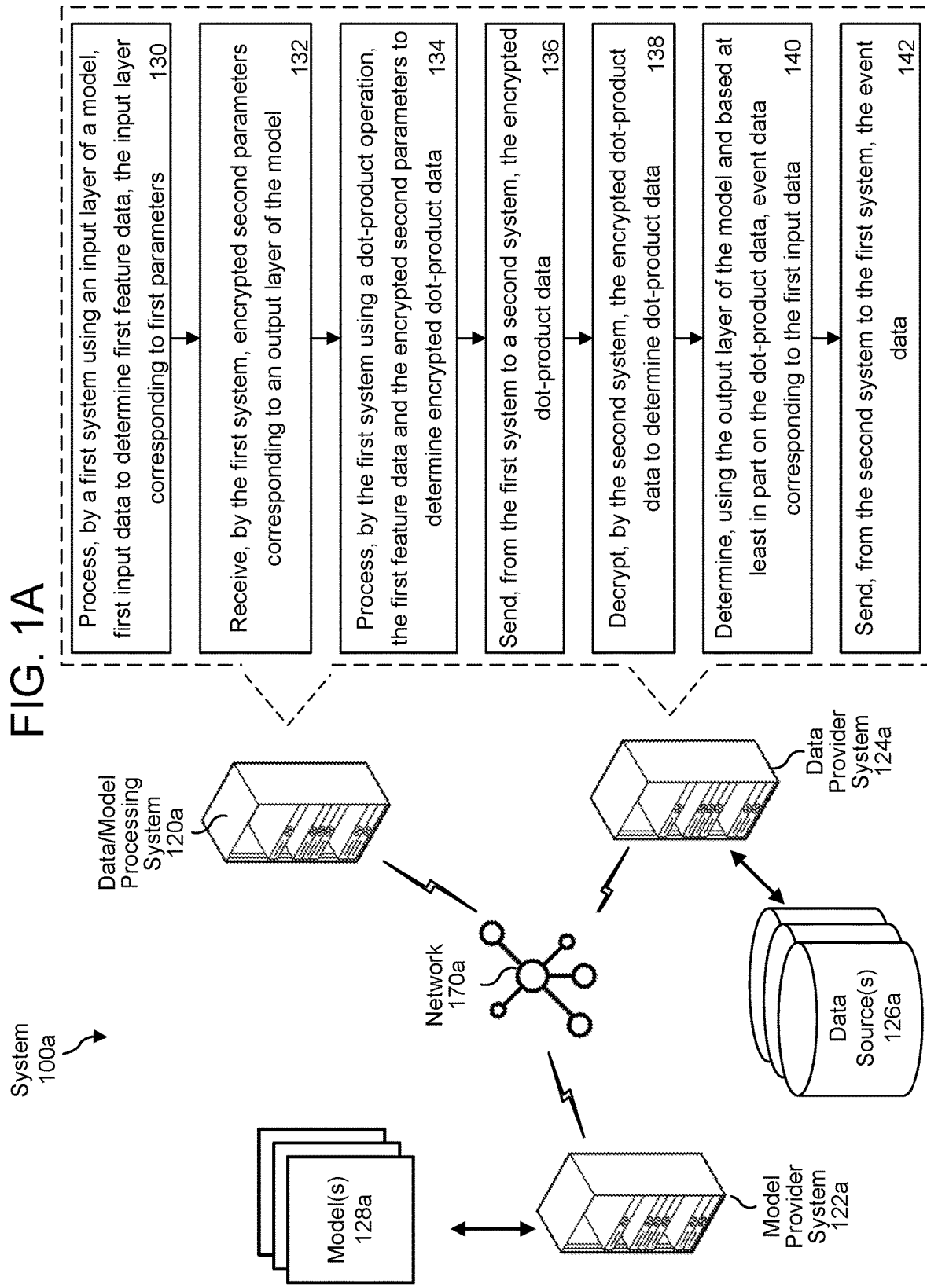

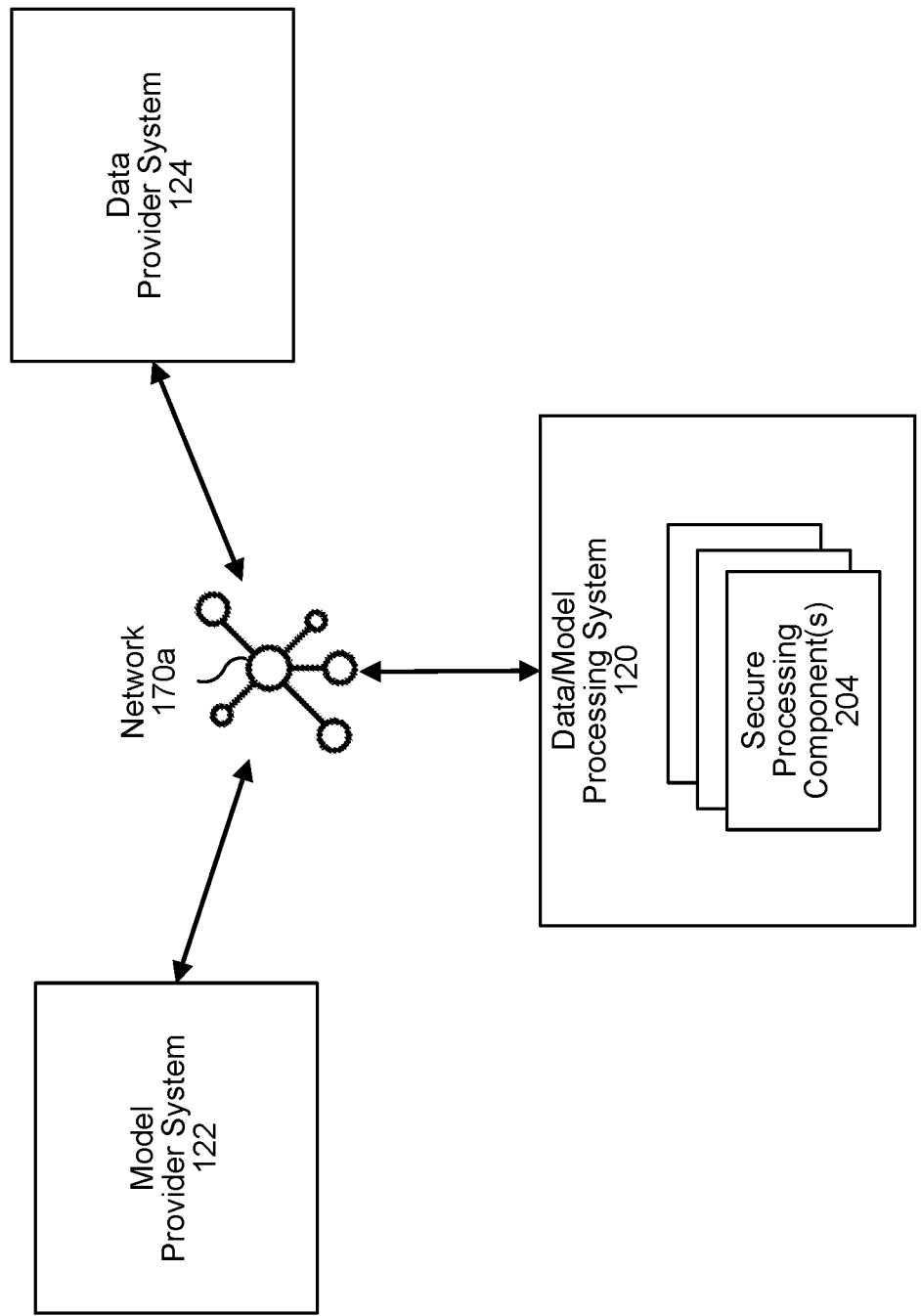

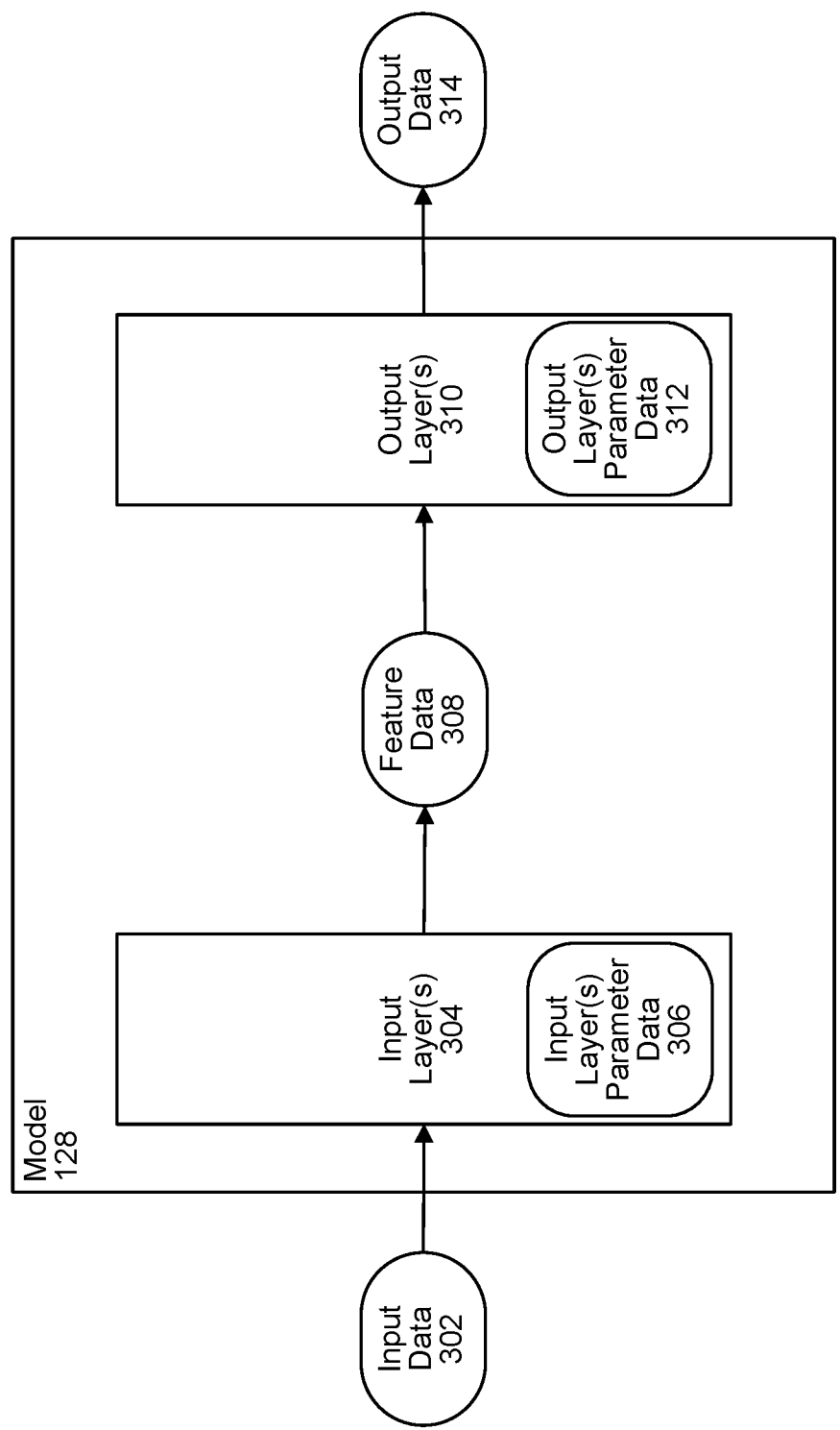

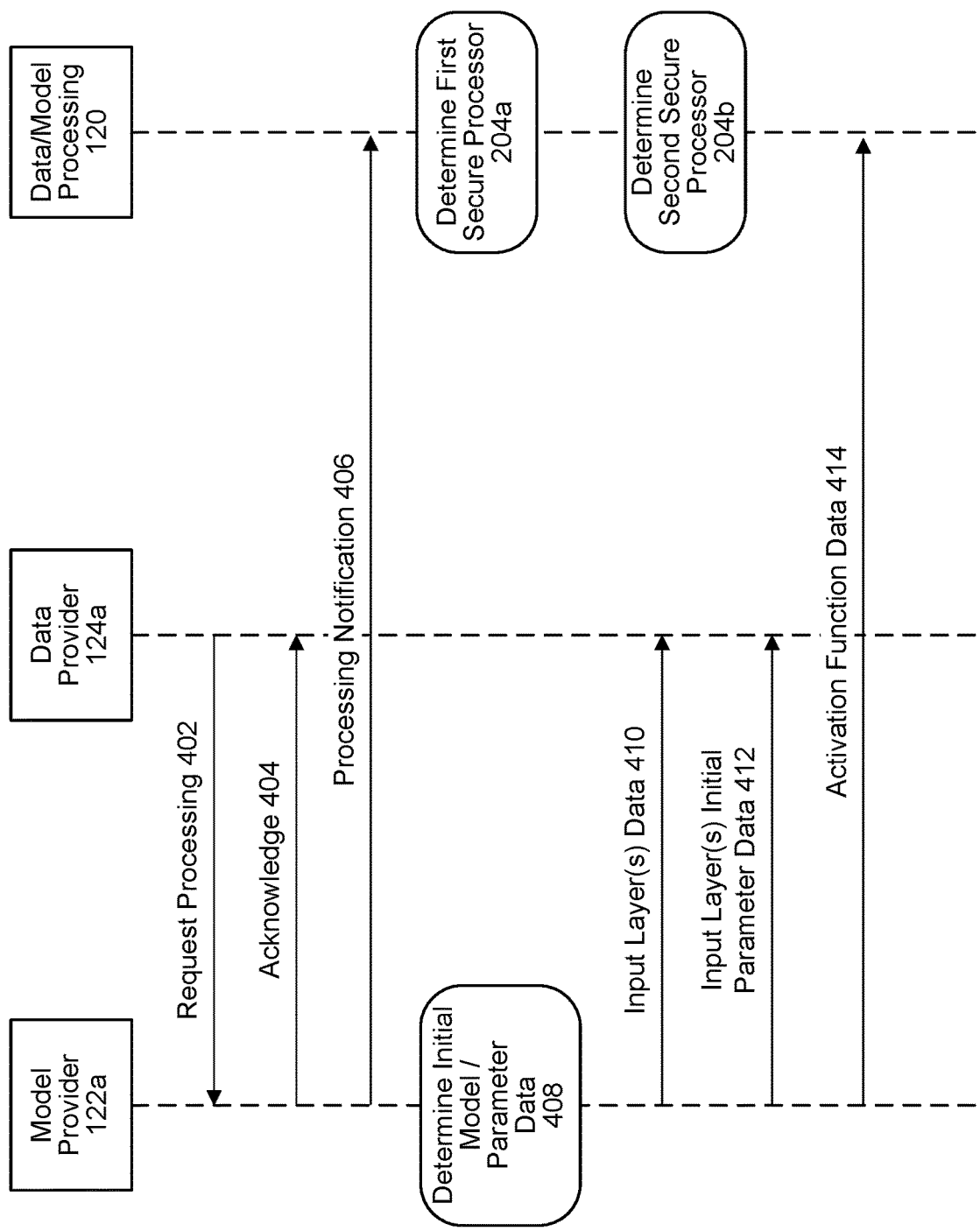

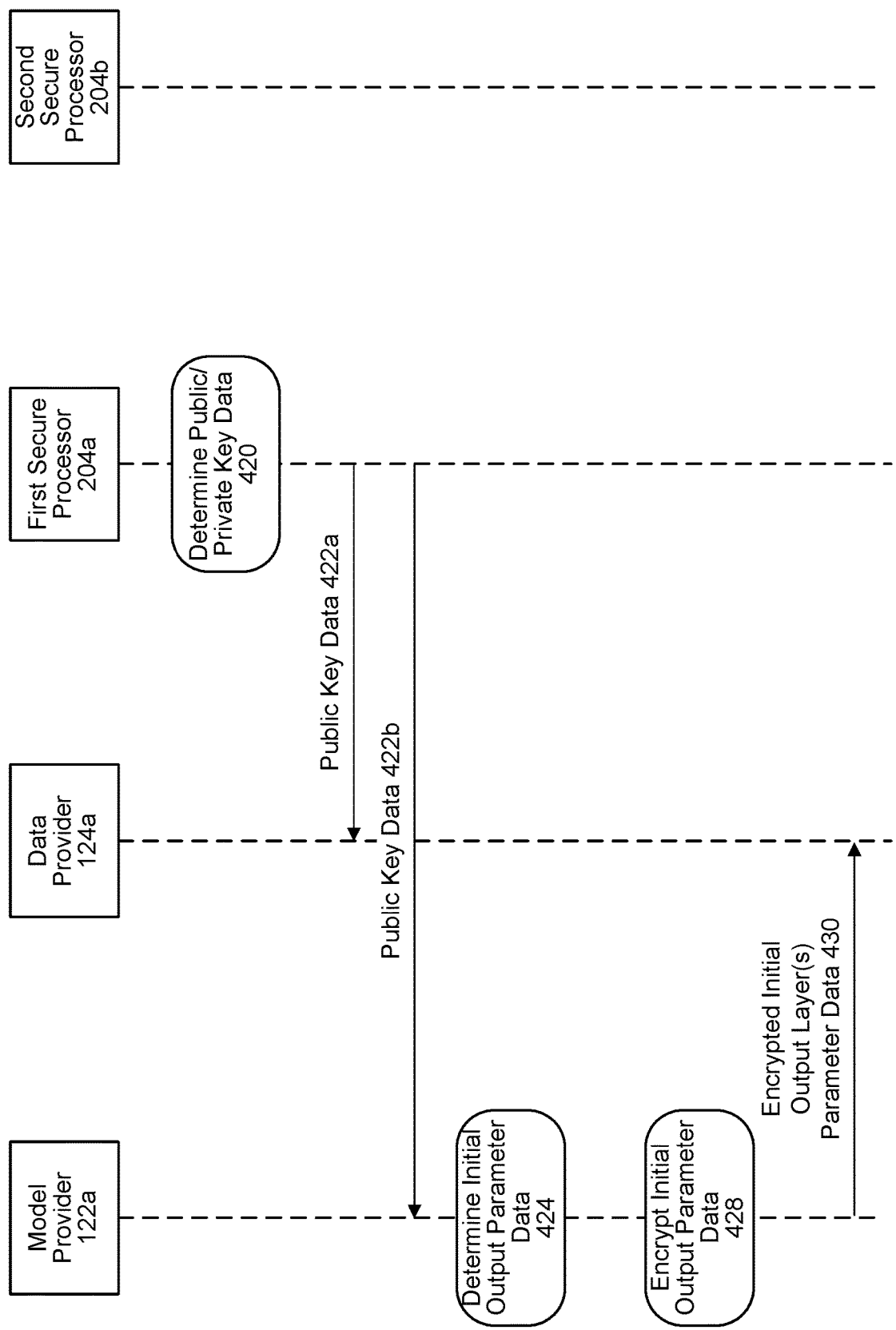

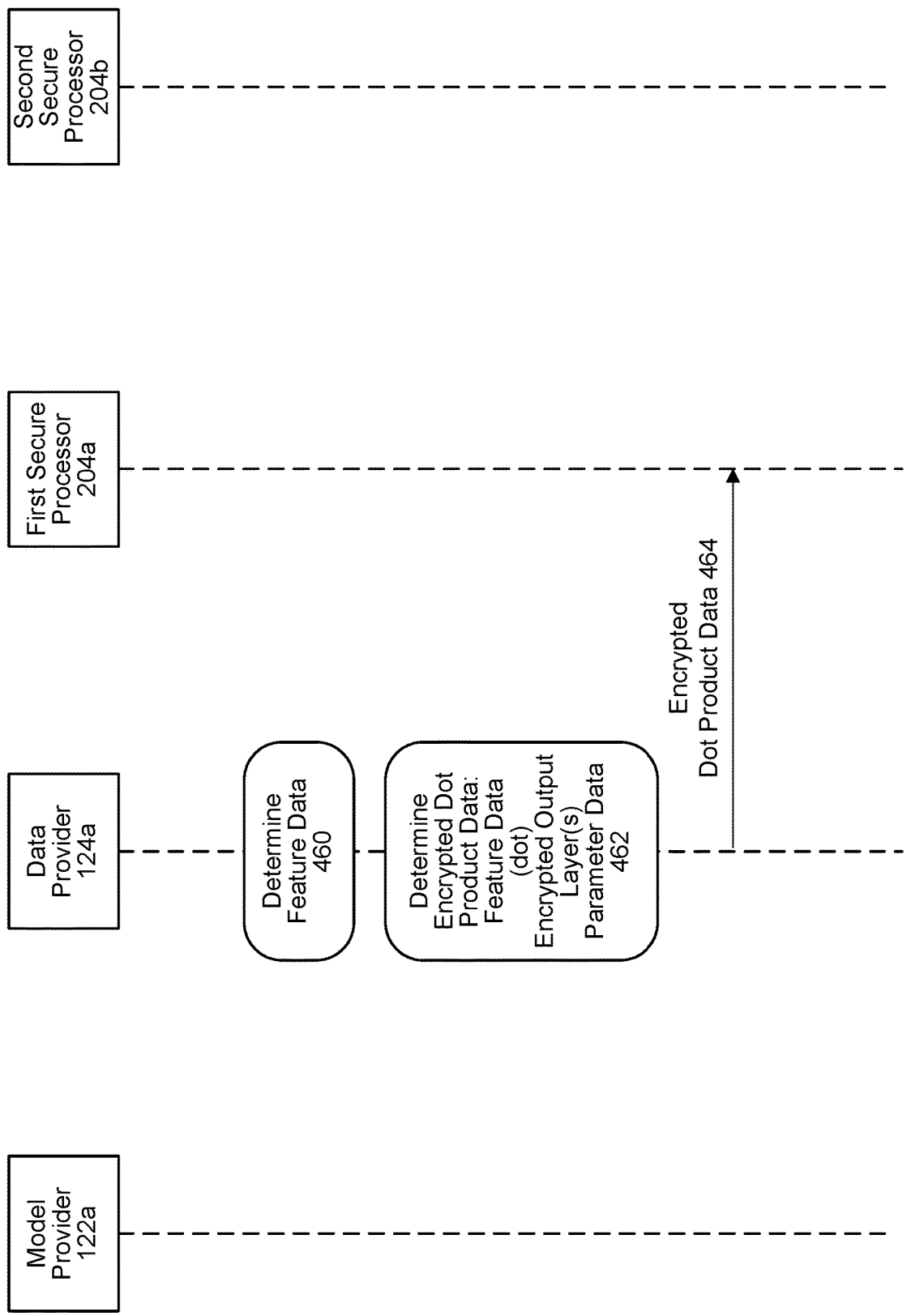

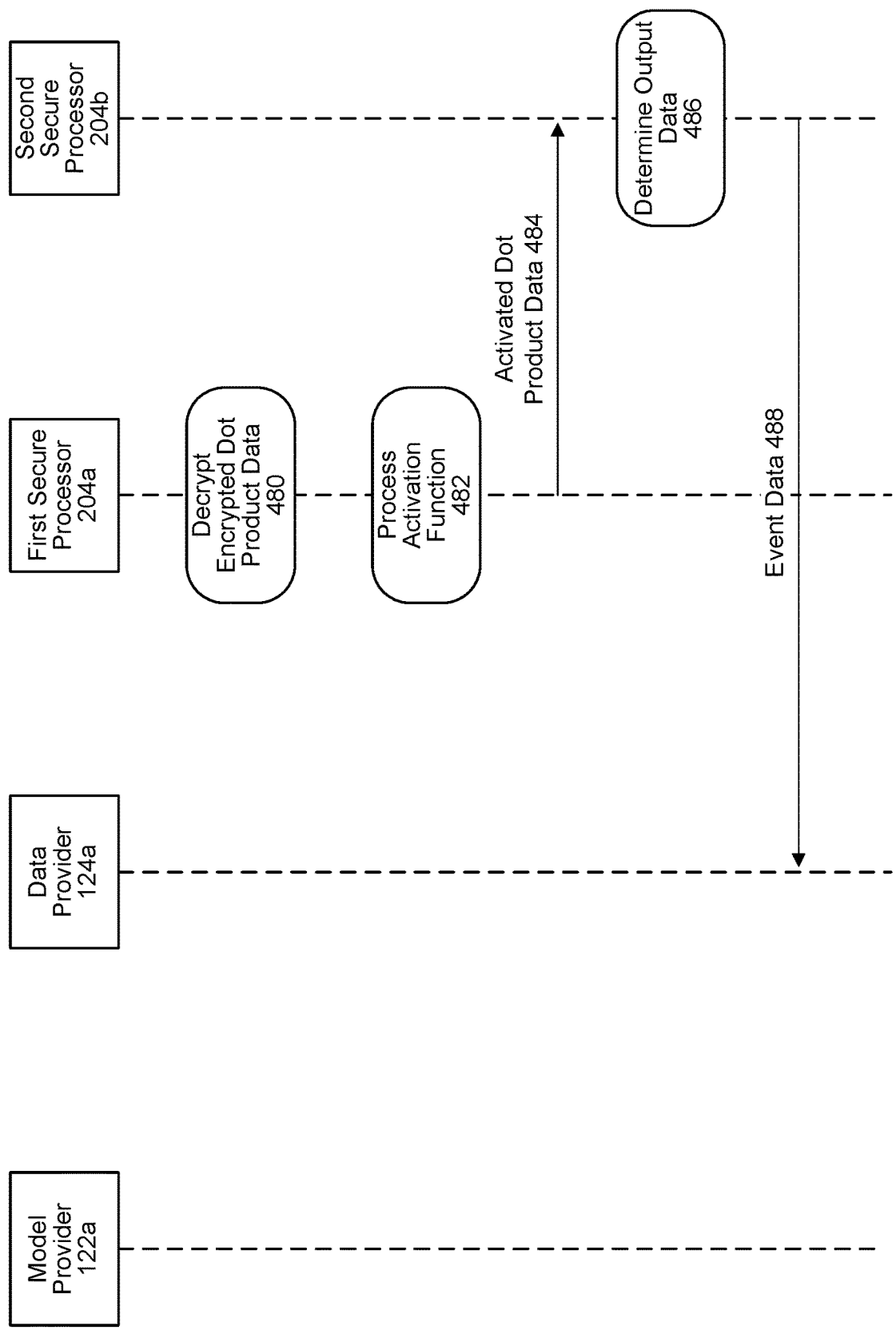

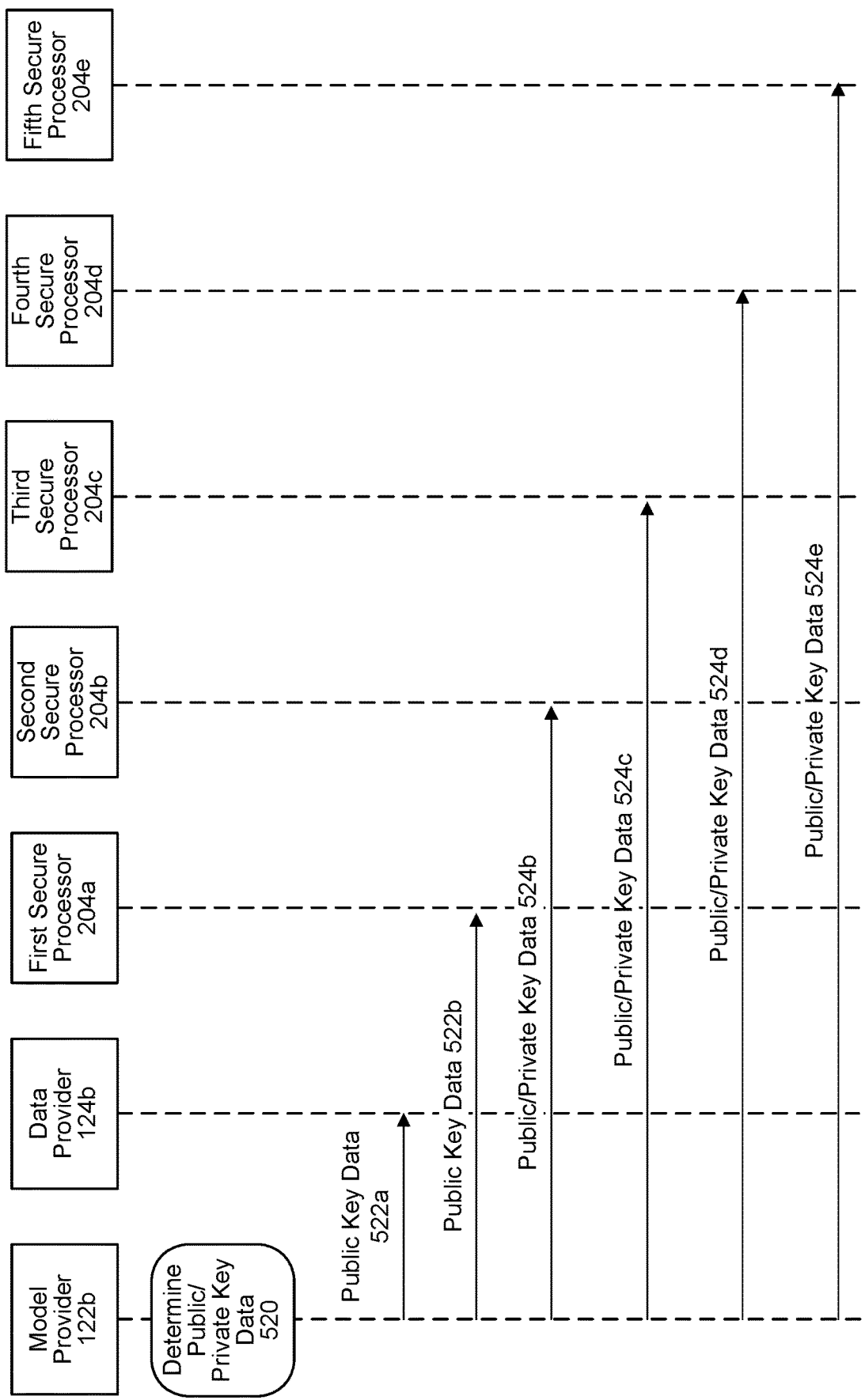

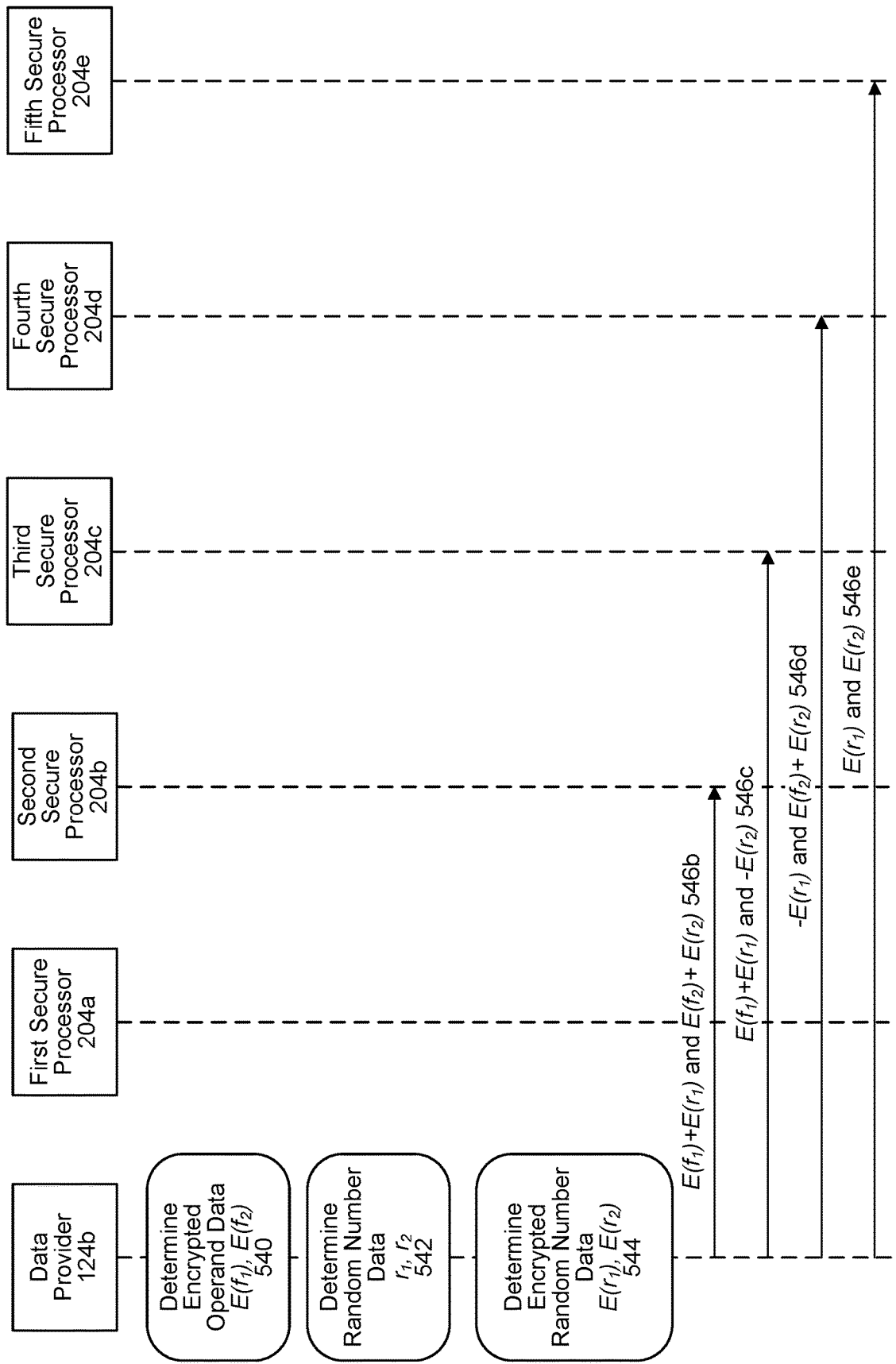

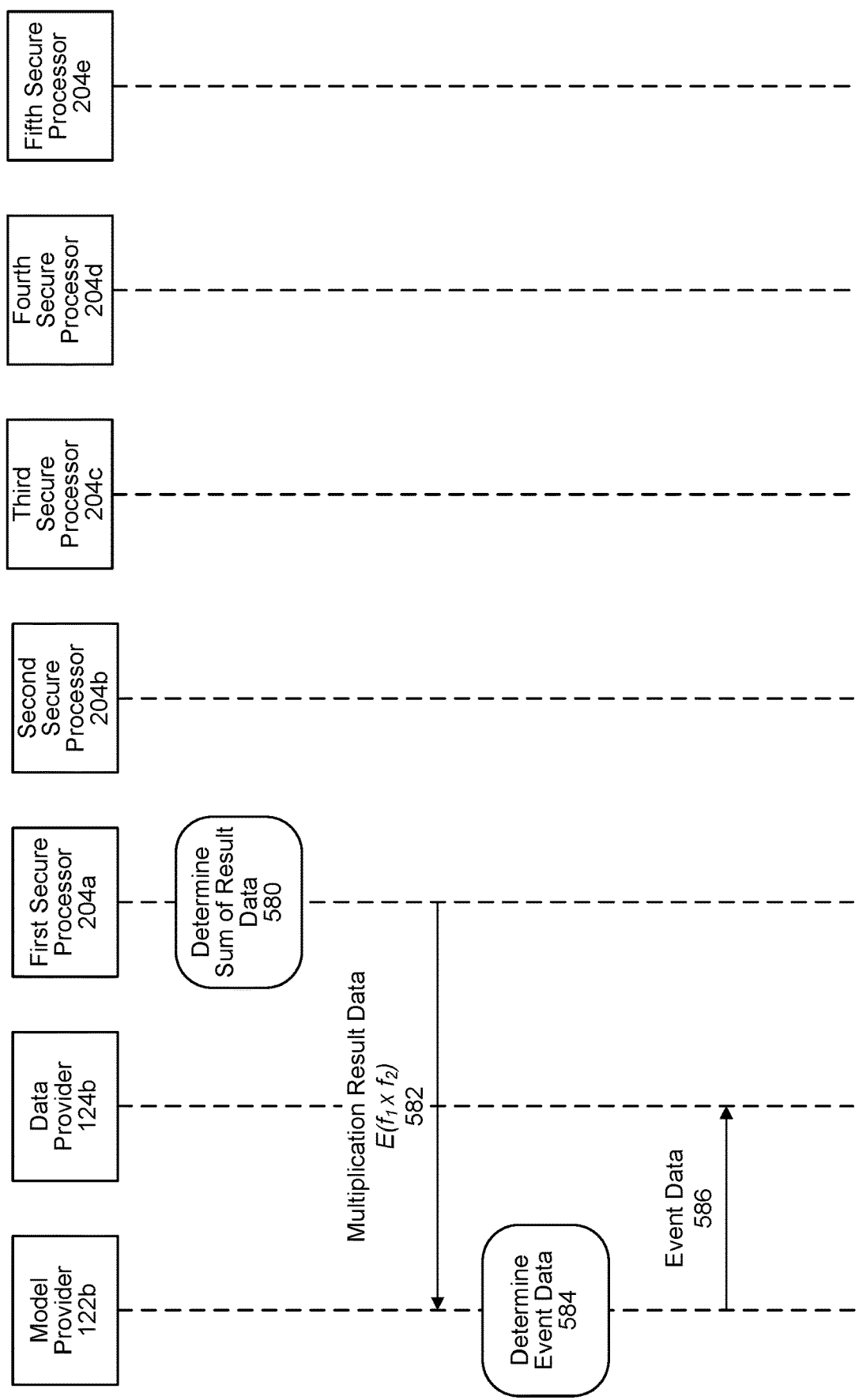

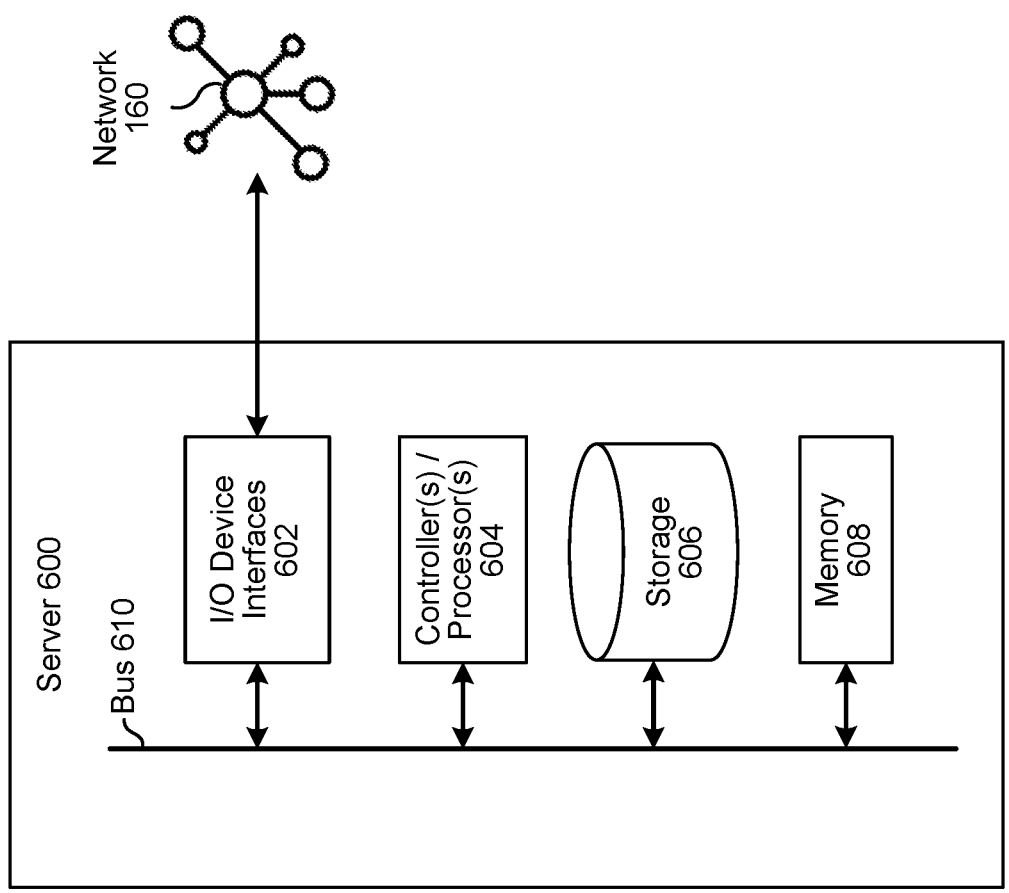

MULTIPLE DATA SOURCE SECURE DATA PROCESSING

CROSS-REFERENCE TO RELATED APPLICATION DATA

This application claims the benefit of and priority to U.S. Provisional Patent Application No. 62/927,908, filed Oct. 30, 2019, and entitled "TAC Secure Dot Product Evaluation," in the names of Kai Chung Cheung, et al.; U.S. Provisional Patent Application No. 62/927,909, filed Oct. 30, 2019, and entitled "Homomorphic Multiplication, Dot Product, and Matrix Multiplication Extension," in the name of Kai Chung Cheung; and U.S. Provisional Patent Application No. 62/935,722, filed Nov. 15, 2019, and entitled "Secure Multiplication Based on TAC," in the name of Kai Chung Cheung. The above provisional applications are herein incorporated by reference in their entirety.

BACKGROUND

Data security and encryption is a branch of computer science that relates to protecting information from disclosure to other systems and allowing only an intended system access to that information. The data may be encrypted using various techniques, such as public/private key cryptography and/or elliptic cryptography, and may be decrypted by the intended recipient using a shared public key and a private key and/or other corresponding decryption technique. Transmission of the data is protected from being decrypted by other systems at least by their lack of possession of the encryption information.

BRIEF DESCRIPTION OF DRAWINGS

For a more complete understanding of the present disclosure, reference is now made to the following description taken in conjunction with the accompanying drawings.

FIGS. 1A and 1B illustrate systems configured to securely process data according to embodiments of the present disclosure.

FIG. 2 illustrates a computing environment including a model-provider system, a data-provider system, and a data/model processing system according to embodiments of the present disclosure.

FIG. 3 illustrates layers of a neural-network model configured to securely process data according to embodiments of the present disclosure.

FIGS. 4A, 4B, 4C, and 4D illustrate processes for securely processing data according to embodiments of the present disclosure.

FIGS. 5A, 5B, 5C, 5D, and 5E illustrate processes for securely processing data according to embodiments of the present disclosure.

FIG. 6 illustrates components of a system according to embodiments of the present disclosure.

SUMMARY

Figure 1B:
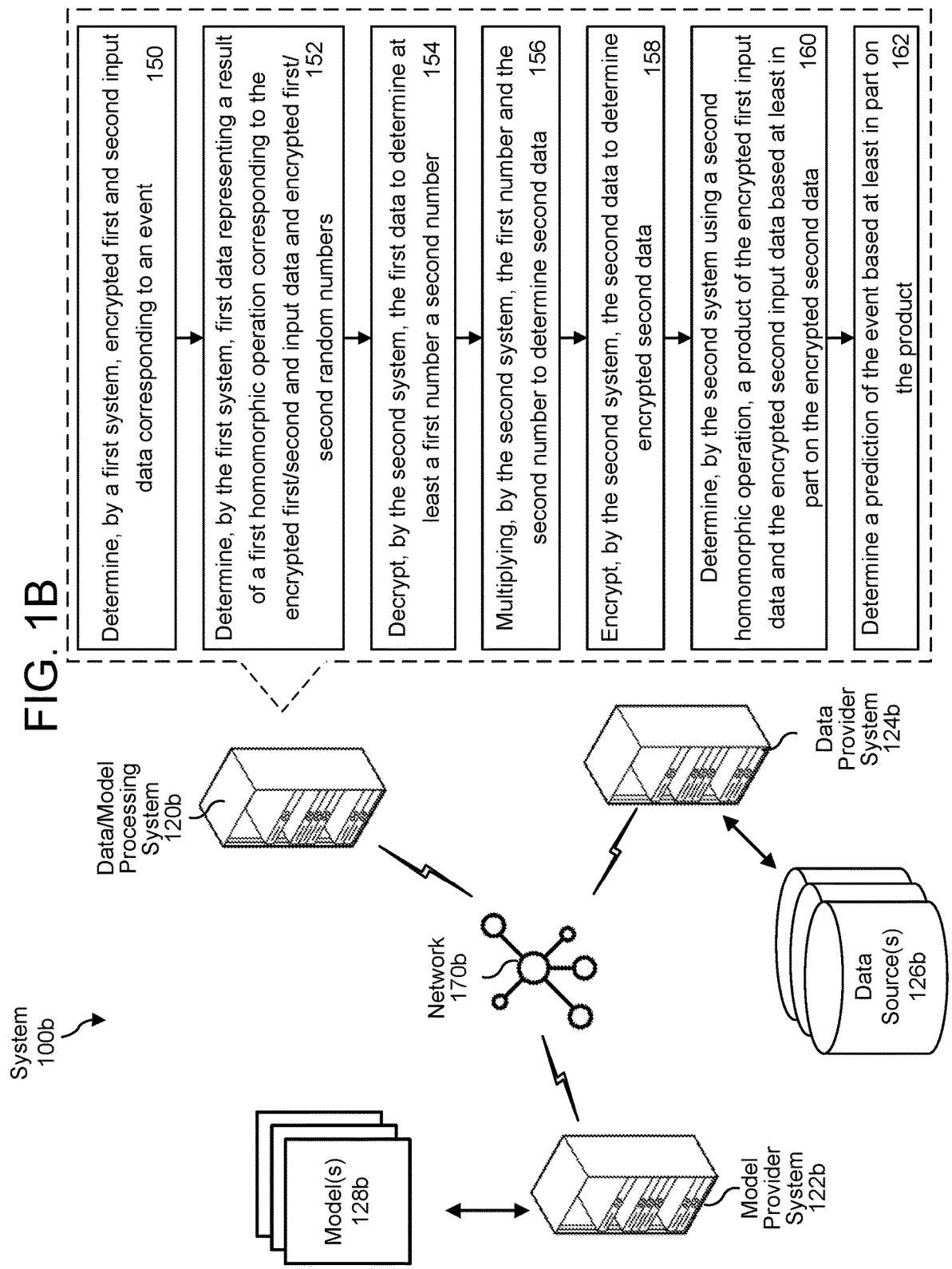

In various embodiments of the present disclosure, a first system with corresponding proprietary data permits a second system to realize a benefit from the data without actually having to transfer the data; the first system shares only an encrypted version of the data. In some embodiments, a data/model processing system is in communication with between the first and second systems on a computer network; two or more data-provider systems may send encrypted versions of their data to the data/model processing system, which adds them together and sends the result to the second system. The data/model processing system cannot decrypt the data because it lacks the necessary keys and/or other encryption information, and the second system can decrypt only the sum of the data, not the original data. In some embodiments, a neural-network model may be trained using the techniques described herein. The model may be evaluated (e.g., used to process input data to determine output data) using two or more systems and a mathematical operation, such as multiplication and/or dot product.

DETAILED DESCRIPTION

Machine-learning systems, such as those that use neural networks, may be trained using training data and then used to make predictions on out-of-sample (i.e., non-training) data to predict an event. A system providing this data, referred to herein as a data-provider system, may acquire this data from one or more data sources. The data-provider system may be, for example, a power company, and may collect data regarding operational status of a particular component (e.g., a transformer); this data may include, for example, temperature, vibration, and/or voltage data collected during use of the component. The data may further include rates of movement of material and/or information in a network and/or other factors that may affect the operation and/or movement, such as atmospheric and/or weather conditions and/or inputs to the component and/or network. The data-provider system may then annotate this data to indicate times at which the component failed. Using this collected and annotated data, the data-provider system may train a neural network to predict an event associated with the input data, such as when the same or similar component will next fail based on the already-known times of past failure and/or changes in the movement of the network. Once trained, the data-provider system may deploy the model to attempt to receive additional data collected from the component and make further predictions using this out-of-sample data.

The data-provider system may, however, have access to insufficient training data, training resources, or other resources required to train a model that is able to predict a given event (e.g., failure of the component and/or change in the network) with sufficient accuracy. The data-provider system may thus communicate with another system, such as a model-provider system, that includes such a model. The data-provider system may thus send data regarding the data source(s) to the model-provider system, and the model-provider system may evaluate the model using the data to predict the event. The model of the model-provider system may be trained using data provided by the data-provider system, other data-provider system(s), and/or other sources of data.

The data-provider system may, however, wish to keep the data from the one or more data sources private and may further not wish to share said data with the model-provider system. The model-provider system may similarly wish to keep the model (and/or one or more trained parameters and/or results thereof) secret with respect to the data-provider system (and/or other systems). A third system, such as one or more secure processor(s) of a data/model processing system, may thus be used to process data using one or more layers of the model (such as one or more input and/or output layers, as described herein) to thus prevent the data-provider system from being able to learn input data, output data, and/or parameter data associated with the full model.

Embodiments of the present disclosure thus relate to systems and methods for securely processing data, such as processing out-of-sample data using a neural-network model to determine output data representing a prediction of an event. The techniques described herein may allow such processing while preventing a first system from having access or otherwise discovering data associated with a second system, such as techniques related to performing a dot-product operation using encrypted data. The techniques described herein may instead or in addition allow for faster processing of data, such as the techniques related to multiplication of encrypted data. In some embodiments, the data-provider system, model-provider system, and/or data/model processing system encrypt their data in accordance with a set of domain parameters corresponding to an encryption technique, such as Rivest-Shamir-Adleman (RSA) encryption, elliptic-curve encryption, or any partially homomorphic encryption; in these embodiments, the data source may send only their encrypted data and may not send the encrypted noise data. Partially homomorphic encryption refers to types of homomorphic encryption that directly support some operations, such as addition and negation, but not other operations, such as multiplication.

FIGS. 1A and 1B show systems that include a data/model processing system 120, a model-provider system 122, a data-provider system 124, and a network 170. The network 170 may include the Internet and/or any other wide- or local-area network, and may include wired, wireless, and/or cellular network hardware. The data/model processing system 120 may communicate, via the network 170, with one or more model-provider systems 122 and/or data-provider systems 124. The data/model processing system 120 may transmit, via the network 170, data to and/or from the other systems using one or more application programming interfaces (APIs). Each API may correspond to a particular application. A particular application may, for example, be operated within the data/model processing system 120 or may be operating using one or more of the other systems.

Referring first to FIG. 1A, in accordance with the present disclosure, a system 100a includes a data/model processing system 120a, a model-provider system 122a with corresponding model(s) 128a, a data-provider system 124, and one or more associated data sources 126. A first system (e.g., the data-provider system 124a) processes (130), using an input layer (e.g., input layer(s) 304) of a neural-network model (e.g., the model 128), first input data to determine first feature data (e.g., feature data 308 of FIG. 3), the input layer corresponding to first neural-network parameters (e.g., the input layer(s) parameter data 306 of FIG. 3). The first system receives (132) encrypted second neural-network parameters (e.g., the output layer(s) parameter data 312) corresponding to an output layer (e.g., output layer 310) of the neural-network model. The first system processes (134), using a multiplication operation corresponding to a dot-product, the first feature data and the encrypted second neural-network parameters to determine encrypted dot-product data, and the first system sends (136), to a second system, the encrypted multiplication data.

The second system decrypts (138) the encrypted multiplication data to determine multiplication data and determines (140), using the output layer of the neural-network model and based at least in part on the multiplication data, event data corresponding to the first input data. As described in greater detail below, the second system may correspond to a first secure-processing component and a second secure-processing component that may cause processing of an activation layer; the output of the activation layer may be the input to the output layer(s). The second system may then send (142), to the first system, the event data. As described herein, the event data may correspond to a prediction of an event, such as failure of a component and/or change in a network.

Referring to FIG. 1B, in accordance with the present disclosure, a system 100b includes a data/model processing system 120b, a model-provider system 122b, a data-provider system 124b, and one or more data sources 126b. A first system (e.g., the data-provider system 124b) determines (150) encrypted first input data and encrypted second input data, wherein at least one of the encrypted first input data and the encrypted second input data correspond to an event. The first and second input data may be, for example, two floating-point numbers representing model input data and/or model parameter data. The first system determines an encrypted first random number and an encrypted second random number, which may be encrypted using a homomorphic encryption algorithm. The first system determines (152) first data representing a result of a first homomorphic operation corresponding to the encrypted first input data, the encrypted second input data, the encrypted first random number, or the encrypted second random number. As described in greater detail below, the first data may represent four pairs of numbers representing the result of four pairs of homomorphic operations. The first system sends, to a second system, the first data; the second system, which may be the data/model processing system 120b, may include four secure-processing components, and each may receive a different pair of numbers. The second system decrypts (154) the first data to determine a first number based at least in part on the encrypted first random number and a second number based at least in part on the encrypted second random number; as described in greater detail herein, the first number and the second number may further be based at least in part on the encrypted first or second input data. The second system multiplies (156) the first number and the second number to determine second data and encrypts (158) the second data to determine encrypted second data. The second system determines (160), using a second homomorphic operation, a product of the encrypted first input data and the encrypted second input data based at least in part on the encrypted second data. As described in greater detail herein, a secure-processing component of the second system may homomorphically add the results of the multiplications to determine the product. The first system and/or second system may then determine (162) a prediction of the event based at least in part on the product.

FIG. 2 illustrates a computing environment including a data/model processing system 120, a model-provider system 122, and a data-provider system 124 according to embodiments of the present disclosure. The data/model processing system 120, described in greater detail below, may be one or more servers configured to receive encrypted data from one or more data sources 126. The model-provider system 122 may be one or more servers and provide and/or train a model, such as a neural-network machine-learning model, configured to process the data from the data sources 126. The data/model processing system 120 and/or the model-provider system 122 may train the model using the data from the data sources 126 by, for example, computing weights of the machine-learning model using, for example, stochastic gradient descent. Once the data/model processing system 120 and/or model-provider system 122 trains the model the model in accordance with one or more metrics, it may send the trained model and/or associated weights to one or more data-provider system(s) 124. In some embodiments, a data-provider system 124 is associated with a data source 126.

Although the data/model processing system 120, the model-provider system 122, data-provider system 124, and data sources 126 are illustrated as separate systems, in some embodiments, one or more of the data/model processing system 120, the model-provider system 122, data-provider system 124, and data sources 126 may be the same system. For example, the model-provider system 122 may also be the data-provider system 124. One or more of the data sources 126 may be the data-provider system 124. The present disclosure is thus not limited to the example environment illustrated in FIG. 2.

The model-provider system 122 may send a model 128 to the data/model processing system 120. The model 128 may be, as explained herein, a neural-network model. The data/model processing system 120 may also send the model 128 to one or more data-provider system(s) 124.

Referring also to FIG. 3, layers of a neural-network model 128 may be configured to securely process data according to embodiments of the present disclosure. The layers may be distributed across different systems, such as the data-provider system 124, the secure-processing component 204, and/or other systems. Each layer may be comprised of nodes having corresponding parameter data, such as weight data, offset data, or other data. Each layer may process input data in accordance with the parameter data to determine output data. The output data may, in turn, be processed by another layer disposed on the same system as that of the first layer or on a different system.

The model 128 may include one or more input layer(s) 304 and one or more output layer(s) 310. The input layer(s) 304 and output layer(s) 310 may include a number of neural-network nodes arranged in each layer to form a deep neural network (DNN) layer, such as a convolutional neural network (CNN) layer, a recurrent neural network (RNN) layer, such as a long short-term memory (LSTM) layer, or other type of layer. The output layer(s) 310 may further include one or more layers that include a number of network nodes arranged in each layer to form an activation function.

One or more input layer(s) 304 may process input data 302 in accordance with input layer(s) parameter data 306 to determine feature data 308. In some embodiments, the input layer(s) 304 are disposed on a data-provider system 124. The input data 302 may comprise one or more vectors of N values corresponding to data collected from one or more data sources 126. The feature data 308 may be processed using output layer(s) 310 in accordance with output layer(s) parameter data 312 to determine output data 314. As described herein, the input layer(s) 304 and output layer(s) 310 may be disposed on a data-provider system 124 and/or on a secure-processing component 204.

In various embodiments, the model-provider system 122 creates and transmits encryption key data including at least one or more keys. The creator of the encryption key data may correspond to an entity trusted to learn the sum of, but not the individual values of, data corresponding to the data-provider system 124. In some embodiments, as described in further detail below, the data/model processing system 120 is trusted to learn only the encrypted sum of the data corresponding to the data-provider system 124 and is not trusted to learn the unencrypted sum of the data. The data/model processing system 120 may then send this encrypted sum to the model-provider system 122, which may determine the unencrypted sum. In these embodiments, the model-provider system 122 creates and distributes the encryption key data.

The encryption key data may include a modulus n, an exponent e, and/or an element a (as explained in greater detail below). The model-provider system 122 may determine the modulus n by multiplying two prime numbers p and q. The prime numbers may, in some embodiments, be Sophie Germain prime numbers and may be, for example, approximately 1024 bits in size, and the modulus n may be approximately 2048 bits in size. The prime numbers p and q may be defined using the below equations (1) and (2).

$$p=2p'+1 \quad (1)$$

$$q=2q'+1 \quad (2)$$

The numbers p' and q' may also be prime numbers. The model-provider system 122 may further compute the public modulus n in accordance with the below equation (3). The public modulus n may, as explained in greater detail below, be sent to and used by a data-provider system 124.

$$n=pq \quad (3)$$

The model-provider system 122 may further compute a function used to select the exponent e that may further be sent to and used by a data-provider system 124. In some embodiments, this function is a Carmichael's totient function $\lambda(n)$, which may be determined in accordance with the below equation (4), in which lcm(x, y) finds the least common multiple of x and y.

$$\lambda(n)=lcm(p-1,q-1) \quad (4)$$

Using equations (1) and (2), equation (4) may be expressed as the below equation (5).

$$\lambda(n)=2p'q' \quad (5)$$

The value of $\lambda(n)$ may be at least 2046 bits in size. The public exponent e may then be determined using the below equation (6), in which gcd(x,y) finds the greatest common denominator of x and y.

$$gcd(\lambda(n),e)=1 \quad (6)$$

The model-provider system 122 may further determine the modular multiplicative inverse d of e in accordance with the below equation (7), in which mod x computes the modulus of x.

$$d=e^{-1} \bmod \lambda(n) \quad (7)$$

The model-provider system 122 may then select an element a of maximum order in a multiplicative group $\mathbb{Z}^*_n$, wherein the maximum order of the multiplicative group $\mathbb{Z}^*_n$ is 2p'q', in accordance with known methods of finding an element of maximum order. In some embodiments, the model-provider system 122 finds a first generator $g_1$ of $\mathbb{Z}^*_p$ in which n=p−1, finds a second generator $g_2$ of $\mathbb{Z}^*_q$ in which n=q−1, and then uses Gauss's Algorithm to find the element a such that $a=g_1 \pmod{p}$ and $a=g_2 \pmod{q}$ and such that $1 \leq a \leq n-1$. The generators may be found by choosing a random element of the multiplicative group $\mathbb{Z}^*_n$, computing b in accordance with the below equation (8), and determining if b is equal to one. If b is equal to one, another random element is chosen and b is again computed. If b is not equal to one, b is selected as the element a.

$$b \leftarrow a^{n/p_i} \quad (8)$$

Gauss's Algorithm may be used to find a in accordance with the below equations (9), (10), and (11).

$$a=\Sigma_{i=1}^{k} a_i N_i M_i \bmod(n) \quad (9)$$

In the above equation (9), $N_i$ may be determined in accordance with the below equation (10).

$$N_i = \frac{n}{n_i} \quad (10)$$

$M_i$ may be determined in accordance with the below equation (11).

$$M_i = N_i^{-1} \bmod(n_i) \quad (11)$$

The model-provider system 122 may further send the element a to a data-provider system 124, which may further use the element a to encrypt data as explained in greater detail below. The model-provider system 122 may, however, keep the multiplicative inverse d secret.

The data-provider system 124 may encrypt data in accordance with an encryption function H(m). In some embodiments, the encryption function H(m) is defined using the below equation (12), in which m is less than the value of the Carmichael's totient function $\lambda(n)$.

$$H(m) = a^{me} (\bmod n) \quad (12)$$

The model-provider system 122 may decrypt data in accordance with a decryption function $H^{-1}(c)$. In some embodiments, the decryption function $H^{-1}(c)$ is defined using the below equation (13), in which $\log_a$ is the discrete logarithm function over base a. The algorithm function $\log_a$ may be computed by using, for example, a "baby-step giant-step" algorithm.

$$H^{-1}(c) = \log_a(c^d)(\bmod n) \quad (13)$$

In various embodiments, data encrypted using the encryption function H(m) is additively homomorphic such that $H(m_1 + m_2)$ may be determined in accordance with the below equations (14) and (15).

$$H(m_1 + m_2) = a^{(m_1 + m_2)e} (\bmod n) \quad (14)$$

$$H(m_1 + m_2) = a^{m_1 e} a^{m_2 e} (\bmod n) \quad (15)$$

In some embodiments, the above equations (14) and (15) may be computed or approximated by multiplying $H(m_1)$ and $H(m_2)$ in accordance with the below equation (16).

$$H(m_1 + m_2) = H(m_1) H(m_2) \quad (16)$$

The data/model processing system 120 may thus, given two items of encrypted data $H(m_1)$ and $H(m_2)$, determine $H(m_1 + m_2)$ without first applying the decryption function $H^{-1}(c)$. In some embodiments, the value of m is 32 bits in size.

In some embodiments, the data-provider system 124 may encrypt data plus noise $(v_i + \eta_i)$ in accordance with a first encryption function H(m), as described above, and may encrypt noise (i) in accordance with a second encryption function K(m). In some embodiments, the model-provider system 122 creates the second encryption function K(m) using the above-described process of creating the first encryption function H(m). The second encryption function K(m) may, however, use a different set of keys, including but not limited to a different public key, which the data-provider system 124 may receive from the model-provider system 122. The data-provider system 124 may encrypt $(v_i + \eta_i)$ using one encryption function (for example, H(m)) and may encrypt $(\eta_i)$ using a different encryption function (for example, K(m)). A data-provider system 124 may determine a value $v_i$ that it wishes to make available for training of the model 128 without allowing knowledge of the actual value of $v_i$ to be possessed by the data/model processing system 120 and/or model-provider system 122. The value $v_i$ may be 32 bits in size.

The data-provider system 124 may select the random noise value using, for example, a random noise generator. The noise value $\eta_i$ may be 368 bits in size. Using the above encryption function H(m), each data-provider system 124 computes $H(v_i + \eta_i)$ and each data-provider system 124 computes $K(\eta_i)$ using the second encryption function K(m). Each data-provider system 124 may then send $H(v_i + \eta_i)$ and $K(\eta_i)$ to the data/model processing system 120. The data-provider system 124 may thereafter delete the noise value to thereby prevent its re-use with subsequent encryption.

The data/model processing system 120 may determine that it has received the encrypted data-plus-noise and the encrypted noise from the data-provider system 124. Once the encrypted data-plus-noise and the encrypted noise is received, the data/model processing system 120 computes the sum $H(\Sigma v_i + \Sigma \eta i)$ of the encrypted values-plus-noise data $H(v_i + \eta_i)$ and the sum $K(\Sigma \eta_i)$ of the encrypted noise data $K(\eta_i)$. As explained above, because the encryption functions H(m) and K(m) are additively homomorphic, the sum $H(\Sigma v_i + \Sigma \eta_i)$ of the encrypted values-plus-noise data $H(v_i + \eta_i)$ and the sum $K(\Sigma \eta_i)$ of the encrypted noise data $K(\eta_i)$ may be determined by multiplying and/or modulo-multiplying each encrypted values-plus-noise data $H(v_i + \eta_i)$ and encrypted noise data $K(\eta_i)$ in accordance with one or more of equations (14), (15), and/or (16). The data/model processing system 120 may then send the sum $H(\Sigma v_i + \Sigma \eta_i)$ and the sum $K(\Sigma \eta_i)$ to the model-provider system 122.

The model-provider system 122 may decrypt the sum $H(\Sigma v_i + \Sigma \eta_i)$ using the decryption function $H^{-1}(c)$ and may decrypt the sum $K(\Sigma \eta_i)$ using the decryption function $K^{-1}(c)$. The model-provider system 122 may then subtract the sum of the decrypted noise data $\Sigma \eta_i$ from the sum of the values-plus-noise data $\Sigma(v_i + \eta_i)$ to determine the sum $\Sigma v_i$ of the values $v_i$.

In some embodiments, the data/model processing system 120 may include a first data/model processing system 120x and a second data/model processing system 120y. As discussed above, each data-provider system 124 may encrypt the values-plus-noise data $v_i + \eta_i$ with a first encryption function H(m) to create the encrypted values-plus-noise data $H(v_i + \eta_i)$, and may encrypt the noise data with a second encryption function K(m) to create the encrypted noise data $K(\eta_i)$. The first data/model processing system 120x may sum the encrypted values-plus-noise data $H(v_i + \eta_i)$ to create the sum $H(\Sigma v_i + \Sigma \eta_i)$, and the second data/model processing system 120y may sum the encrypted noise data $K(\eta_i)$ to create the sum $H(\Sigma \eta_i)$. The model-provider system 122, as described above, may then remove the sum $K(\Sigma \eta_i)$ from the sum $H(\Sigma v_i + \Sigma \eta_i)$ to determine the sum $\Sigma v_i$ of the values $v_i$.

In some embodiments, the data-provider system 124 sends the encrypted noise data $H(\eta_i)$ to the model-provider system 122 because the data/model processing system 120 is not trusted to learn the sum $\Sigma v_i$ of the data $v_i$. In these embodiments, the data-provider system 124 computes the values-plus-noise data $H(v_i + \eta_i)$, as described above, and send the values-plus-noise data $H(v_i + \eta_i)$ to the data/model processing system 120. The data-provider system 124 similarly computes the noise data $H(\eta_i)$, as described above, but send the noise data $H(\eta_i)$ to the model-provider system 122, not the data/model processing system 120. The data/model processing system 120 computes the sum $H(\Sigma v_i + \Sigma \eta_i)$ of the encrypted values-plus-noise data $H(v_i + \eta_i)$. As explained above, because the encryption function H(m) is additively homomorphic, the sum $H(\Sigma v_i + \Sigma \eta_i)$ of the encrypted valuesplus-noise data $H(v_i+\eta_i)$ may be determined by multiplying each encrypted values-plus-noise data $H(v_i+\eta_i)$.

The data/model processing system 120 may then send the sum $H(\Sigma v_i+\Sigma \eta_i)$ of the encrypted values-plus-noise data $H(v_i+\eta_i)$ to the model-provider system 122. The model-provider system 122 may then remove the encrypted noise data $H(\eta_i)$ from the sum $H(\Sigma v_i+\Sigma \eta_i)$ to determine the encrypted sum $H(\Sigma v_i)$ and, finally, the sum $\Sigma v_i$. In some embodiments, the model-provider system 122 may decrypt each encrypted noise data $H(\eta_i)$ using the decryption function $H^{-1}(c)$. The model-provider system 122 may then decrypt the sum of the encrypted values-plus-noise data $H(v_i+\eta_i)$ and subtract the decrypted noise data from the sum of the decrypted values-plus-noise data $(v_i+\eta_i)$ to determine the sum $(\Sigma v_i)$ of the values $v_i$. In other embodiments, the model-provider system 122 subtracts the encrypted noise data $H(\eta_i)$ from the sum $H(\Sigma v_i+\Sigma \eta_i)$ to determine the encrypted sum $H(\Sigma v_i)$. The model-provider system 122 may subtract the encrypted noise data $H(\eta_i)$ individually or may, in some embodiments, add the encrypted noise data $H(\eta_i)$ together to create summed encrypted noise data $H(\Sigma \eta_i)$ before subtracting it from the encrypted sum $H(\Sigma v_i+\Sigma \eta_i)$. The model-provider system 122 may then determine the sum $\Sigma v_i$ of the data $v_i$ using the decryption function $H^{-1}(c)$.

In various embodiments, the system(s) permits processing of integers and fixed-point numbers having sizes greater than 32 bits and permits up to $2^m$ data-provider systems 124, where m is between 2 and 31 and wherein a block size is as large as 32−m. The value m may be, in some embodiments, 16. In various embodiments, a given fixed-point number $f_i$ may be expressed as an integer $u_i$ in accordance with the below equation (17).

$$f_i = \frac{u_i}{10^s} \quad (17)$$

In equation (17), s is any integer; the equation thus shifts the decimal point off to the right or left some number of places. In some embodiments, the decimal point is shifted to the right a number of places necessary to convert the fixed-point $f_i$ to the integer $u_i$. The data/model processing system 120, model-provider system 122, and data-provider system 124 may all use the same value for s. If s is smaller than the actual number of decimal places of $f_i$, the integer $u_i$ may represent a rounded value of $f_i$; if s is larger than the actual number of decimal places of $f_i$, the integer $u_i$ may include a number of zeros at its end. The sum of the $f_i$ values may similarly relate to the sum of the $u_i$ values in accordance with the below equation (18).

$$\Sigma f_i = \frac{\Sigma u_i}{10^s} \quad (18)$$

Each integer value $u_i$ may be expressed as a sum of 16-bit blocks in accordance with the below equation (19).

$$u_i = \sum_i \sum_j \frac{u_{ij}}{2^{16j}} \quad (19)$$

Thus, $u_i$ may be defined as a set of values $<u_{ij}>$, where $u_{ij}$ is the value for each 16-bit block. Each value of $u_{ij}$ may be between $-2^{15}$ and $2^{15}-1$; because each block is 16 bits, the sum of all the values of $u_{ij}$ may between $-2^{31}$ and $2^{31}-1$. In addition, because each block is 16 bits, there may be up to $2^{16}$ data-provider systems 124.

Thus the model-provider system 122 may define the value s and transmit the value s to the data-provider system 124. The model-provider system 122 may similarly define and transmit a block size, such as 16 bits, to the data/model processing system 120 and/or data-provider system 124. The data-provider system 124 possesses at least one fixed-point value $f_i$, which it converts to the corresponding integer $u_i$ in accordance with equation (19), and may compute $u_i=<u_{ij}>$ using the value s and the block size, in accordance with equation (16). The data-provider system 124 may encrypt these values using the encryption function $H(m)$, as described above, and send the encrypted data to the data/model processing system 120. The data/model processing system 120 may compute the sum of all the encrypted data received from the data-provider system(s) 124, as described above, and send the sum to the model-provider system 122. The model-provider system 122 may compute the unencrypted sum of all the encrypted data using the decryption function $H^{-1}(c)$, as described above, and may convert the integer value $u_i$ to its corresponding fixed-point value $f_i$ using equation (19).

The data-provider system 124 may determine and use a noise value noise value when sending the data to the data/model processing system 120, as described above. In some embodiments, in addition to using the noise value $\eta_i$ as described above, the data-provider system 124 determines and use a second noise value $p_i$. For example, in cases in which $u_i$ is small and j is large, some values of $u_{ij}$ may be zero. If $u_{ij}$ is zero, the encrypted value $H(u_{ij}+\eta_i)$ becomes simply $H(\eta_i)$, and a component of the system not permitted to learn such as, in some embodiments, the data/model processing system 120, could learn noise value $\eta_i$ simply by decrypting $H^{-1}(u_{ij}+\eta_i)$.

Thus, in some embodiments, the data-provider system 124 adds the second noise value $p_i$ to the integer value $u_i$ before processing the integer value $u_i$. The data-provider system 124 sends the encrypted data-plus-first-noise value to the data/model processing system 120; the data-provider system 124 also sends the encrypted first noise value and the encrypted second noise value to the model-provider system 122. After computing $u_i$ as described above, the model-provider system 122 may decrypt the encrypted second noise value $p_i$ and remove it from the data value $u_i$, as described above.

In some embodiments, the data/model processing system 120, model-provider system 122, and/or data-provider system 124 may use elliptic-curve cryptography to securely process, send, and/or receive data. Elliptic-curve cryptography utilizes an elliptic curve to encrypt data, as opposed to multiplying two prime numbers to create a modulus, as described above. An elliptic curve E is a plane curve over a finite field $F_p$ of prime numbers that satisfies the below equation (20).

$$y^2 = x^3 + ax + b \quad (20)$$

The finite field $F_p$ of prime numbers may be, for example, the NIST P-521 field defined by the U.S. National Institute of Standards and Technology (NIST). In some embodiments, elliptic curves over binary fields, such as NIST curve B-571, may be used as the finite field $F_p$ of prime numbers. A key is represented as (x,y) coordinates of a point on the curve; an operator may be defined such that using the operator on two (x,y) coordinates on the curve yields a third (x,y) coordinate also on the curve. Thus, key transfer may be performed by transmitting only one coordinate and identifying information of the second coordinate.

The above elliptic curve may have a generator point, G, that is a point on the curve—e.g., G=(x,y)∈E. A number n of points on the curve may have the same order as G—e.g., n=o(G). The identity element of the curve E may be infinity. A cofactor h of the curve E may be defined by the following equation (21).

$$h = \frac{|E(F_p)|}{o(G)} \quad (21)$$

A first system, such as the model-provider system 122, may select a private key $n_B$ that is less than o(G). In various embodiments, the data/model processing system 120 is not the first system and thus does not know the private key $n_B$. The first system may generate a public key $P_B$ in accordance with equation (22).

$$P_B = n_B G = E_i^{n_B} G \quad (22)$$

The first system may then transmit the public key $P_B$ to a second system, such as a data-provider system 124. The first system may similarly transmit encryption key data corresponding to domain parameters (p, a, b, G, n, h). The data-provider system 124 may then encrypt data m using the public key $P_B$. The data-provider system 124 may first encode the data m; if m is greater than zero, the data-provider system 124 may encode it in accordance with mG; m is less than zero, the data-provider system 124 may encode it in accordance with (−m)G⁻¹. If G=(x,y), G⁻¹=(x,−y). In the below equations, however, the encoded data is represented as mG for clarity. The data-provider system 124 may perform the encoding using, for example, a doubling-and-adding method, in O(log(m)) time.

To encrypt the encoded data mG, the data-provider system 124 may select a random number c, wherein c is greater than zero and less than a finite field prime number p. The data-provider system 124 may thereafter determine and send encrypted data in accordance with the below equation (23).

$$\{cG, mG + cP_B\} \quad (23)$$

The model-provider system 122 may receive the encrypted data from the data-provider system 124 and may first determine a product of the random number c and the public key $P_B$ in accordance with equation (24).

$$cP_B = c(n_B G) = n_B(cG) \quad (24)$$

The model-provider system 122 may then determine a product of the data m and the generator point G in accordance with the below equation (25).

$$mG = (mG + cP_B) - n_B(cG) \quad (25)$$

Finally, the model-provider system 122 may decode mG to determine the data m. This decoding, which may be referred to as solving the elliptic curve discrete logarithm, may be performed using, for example, a baby-step-giant-step algorithm in $O(\sqrt{m})$ time.

The data-provider system 124 may encrypt data $v_i$ using the public key $P_B$ and a selected random value c to create encrypted data in accordance with the above equation (23). The data $v_i$ may be, for example, a 32-bit signed integer value. The encrypted data may correspond to a pair of integers; the first integer may be ($c_i G$), and the second integer may be ($v_i G + c_i P_B$). Each data-provider system 124 may then send the encrypted data to the data/model processing system 120 using, in some embodiments, a secure connection. Because, as described above, the encrypted data is additively homomorphic, the data/model processing system 120 may compute the sum of the received data in accordance with the above equations (14), (15), and/or (16). The data/model processing system 120 may then send the sum to the model-provider system 122. The sum may correspond to a pair of integers; the first integer may be $\Sigma(c_i G)$, and the second integer may be $(\Sigma v_i G + \Sigma c_i P_B)$.

The model-provider system 122 may decrypt the sum by first determining the product of the sum of the random numbers c and the public key $P_B$ (i.e., the second half of the second integer of the sum), using the first integer, the private key 11B, and the generator G, in accordance with the below equation (26).

$$\Sigma_i c_i P_B = \Sigma_i c_i (n_B G) = n_B(\Sigma_i c_i G) \quad (26)$$

The model-provider system 122 may then determine the product of the sum of the data $v_i$ and G by subtracting the second half of the second integer of the sum from the second integer of the sum in accordance with the below equation (27).

$$\Sigma_i v_i G = (\Sigma_i v_i G + \Sigma_i c_i P_B) - \Sigma_i c_i P_B \quad (27)$$

The model-provider system 122 may then decode the sum $\Sigma v_i G$ to determine $\Sigma v_i$ using, as described above, a baby-step-giant-step algorithm.

In some embodiments, the data/model processing system 120, model-provider system 122, and/or data-provider system 124 send and/or receive data in blocks, such as 16-bit blocks, which permits the sending and receiving of fixed point numbers and/or integers larger than 32 bits. The model-provider system 122 may determine an integer s in accordance with equation (17) and transmit the integer s to the data-provider system 124. Each data-provider system 124 may then convert a fixed-point number to an integer in accordance with equation (18) and/or create a number 16-bit blocks representing the number in accordance with equation (19) prior to sending encrypting and sending the data.

Referring to FIGS. 4A-4D, in various embodiments, processing by layers l of a neural-network model 128 may be expressed as matrix multiplication of an instance of data X by a weight matrix θ. This matrix multiplication may further be expressed as a number of dot-product operations each using a row of a first matrix as a first operand and a column of a second matrix as a second operand. In general, using the homomorphic encryption techniques described herein, the result of multiplying an encrypted number $\varepsilon^{-1}(\theta)$ by an unencrypted number X may be decrypted to determine the decrypted product θX, as shown below in Equation (28).

$$\varepsilon^{-1}(X\varepsilon(\theta)) = X\varepsilon^{-1}\varepsilon(\theta) = X\theta \quad (28)$$

Further, the sum of encrypted numbers $\varepsilon(X_1)$ and $\varepsilon(X_2)$ may be similarly decrypted as shown below in Equation (29).

$$\varepsilon^{-1}(\varepsilon(X_1) + \varepsilon(X_2)) = X_1 + X_2 \quad (29)$$

Based in part on Equations (28) and (29) the dot-product of an unencrypted vector X and an encrypted vector ε(θ) may be computed as shown below in Equation (30).

$$\varepsilon^{-1}(\Sigma_p X_p \varepsilon(\theta_p)) = \Sigma_p X_p \theta_p = X \cdot \theta \quad (30)$$

Thus, operation of the model 128 may be described as below in equation (31), wherein Y is the model output data, X is the model input data, and $f$ is an activation function.

$$Y = f(\Sigma_p X_p \theta_p) \quad (31)$$

A system such as the data/model processing system 120 that has access to the decryption function $\varepsilon^{-1}(\,)$ may thus receive the encrypted result of the dot product $X \cdot \varepsilon(\theta)$, decrypt it, and apply the activation function $f$ to determine the output data Y, as shown below in Equation (32).

$$Y=f(\Sigma^{-1}(\Sigma_p X_p \varepsilon(\theta_p))) \qquad (32)$$

Referring first to FIG. 4A, the data-provider system 124*a* may send, to the model-provider system 122*a*, a request (402) to enable prediction of one or more events using one or more items of input data. This request may include an indication of the event. If, for example, the event corresponds to predicted failure of a component corresponding to the data-provider system 124*a*, the indication may include information identifying the component, such as a description of the component, a function of the component, and/or a serial and/or model number of the component. The indication may further include a desired time until failure of the component, such as one day, two days, one week, or other such duration of time.

In some embodiments, the model-provider system 122*a* may, upon receipt of the request, send a corresponding acknowledgement (404) indicating acceptance of the request. The acknowledgement may indicate that the model-provider system is capable of enabling prediction of occurrence of the event (within, in some embodiments, the desired duration of time). In some embodiments, however, the model-provider system 122*a* may send, to the data-provider system 124*a*, response data. This response data may include a request for further information identifying the component (such as additional description of the component and/or further information identifying the component, such as a make and/or model number). The data-provider system 124*a* may then send, in response to the request, the additional information, and the model-provider system 122*a* may then send the acknowledgement in response.

The response data may further include an indication of a period of time corresponding to the prediction of the event different from the period of time requested by the data-provider system 124*a*. For example, the data-provider system 124*a* may request that the prediction corresponds to a period of time approximately equal to two weeks before failure of the component. The model-provider system 122*a* may be incapable of enabling this prediction; the model-provider system 122*a* may therefore send, to the data-provider system 124*a*, an indication of a prediction that corresponds to a period of time approximately equal to one week before failure of the component. The data-provider system 124*a* may accept or reject this indication and may send further data to the model-provider system 122*a* indicating the acceptance or rejection; the model-provider system 122*a* may send the acknowledgement in response. The model-provider system 122*a* may further send, to the data/model processing system 120*a* and/or the secure-processing component 204*a*, a notification (406) indication the initiation of processing. Upon receipt, the data/model processing system 120*a* may create or otherwise enable use of a first secure-processing component 204*a* and a second secure-processing component 204*b*, which may be referred to as a container, data silo, and/or sandbox. The secure-processing components 204*a*, 204*b* may thus be associated with computing and/or software resources capable of performing processing, such as dot-product processing, as described herein without making the details of said processing known to at least one other system (such as the data-provider system 124*a*).

The model-provider system 122*a* may then select a model 128 corresponding to the request (402) and/or data-provider system 124*a* and determine parameters associated with the model 128. The parameters may include, for one or more nodes in the model, neural-network weights, neural-network offsets, or other such parameters. The parameters may include a set of floating-point or other numbers representing the weights and/or offsets.

The model-provider system 122*a* may select a model 128 previously trained (or partly trained) in response to a previous request similar to the request 402 and/or data from a previous data-provider system 124 similar to the data-provider system 124*a*. For example, if the data-provider system 124*a* is an energy-provider company, the model-provider system 122*a* may select a model 128 trained using data from other energy-provider companies. Similarly, if the request 402 is associated with a particular component, the model-provider system 122*a* may select a model 128 trained using data associated with the component. The model-provider system 122*a* may then determine (408) initial parameter data associated with the selected model 128. In other embodiments, the model-provider system 122*a* selects a generic model 128 and determines default and/or random parameters for the generic model 128.

The model-provider system 122*a* may then send, to the data provider system 124*a*, input layer(s) data (410) and input layer(s) initial parameter data 412. The model-provider system 122*a* may similarly send, to the data/model processing system 120, activation function data 414 corresponding to a type of an activation function and/or parameters associated with the activation function. This sending of the initial data may be performed once for each data-provider system 124*a* and/or data/model processing system 120 (and then, as described below, multiple training steps may be performed using these same sets of initial data). In other embodiments, the model-provider system 122*a* may determine and send different sets of initial data.

Referring to FIG. 4B, the first secure-processing component 204 may determine (420) public/private key data and may send (422*a*) the public key data to the data-provider system 124*a* and may send (422*b*) the public key data to the model-provider system 122*a*. The model-provider system 122*a* may determine (424) initial output parameter data 424 (e.g., parameter data corresponding to output layer(s) 310). The model-provider system 122*a* may encrypt (428) the initial output layer(s) parameter data using the public key data and may send (430) the resultant encrypted initial output layer(s) parameter data 430 to the data-provider system 124*a*.

Referring to FIG. 4B, the data-provider system 124*a* may process input data (e.g., out-of-sample input data associated with a data source 126) using the input layer(s) 304 and the output layer(s) parameter data 312) to determine (460) feature data 308. The data-provider system may further determine (462) encrypted dot product data, which may be multiplication data, in accordance with Equation (32), wherein X represents the feature data 308 and $\varepsilon(\theta)$ represents the encrypted output layer(s) parameter data 312. The data-provider system 124*a* may then send (464) the encrypted dot-product data (which may be encrypted multiplication data) to the first secure-processing component 204*a*.

Referring to FIG. 4D, the first secure-processing component 204*a* may decrypt (480), using the private key data, the encrypted dot-product data to determine the dot product data. The first secure-processing component may then process (482) the dot product data using the activation function to determine activated dot-product data, which it may then send (484) to the second secure-processing component 204*b*. The second secure-processing component 204*b* may then determine (486) output data 314 by processing the activated dot-product data using the output layer(s) 310. The output data 314 may represent a prediction of an event, which the second secure-processing component 204b may then send (488) to the data-provider system 124a.

Figure 5A:
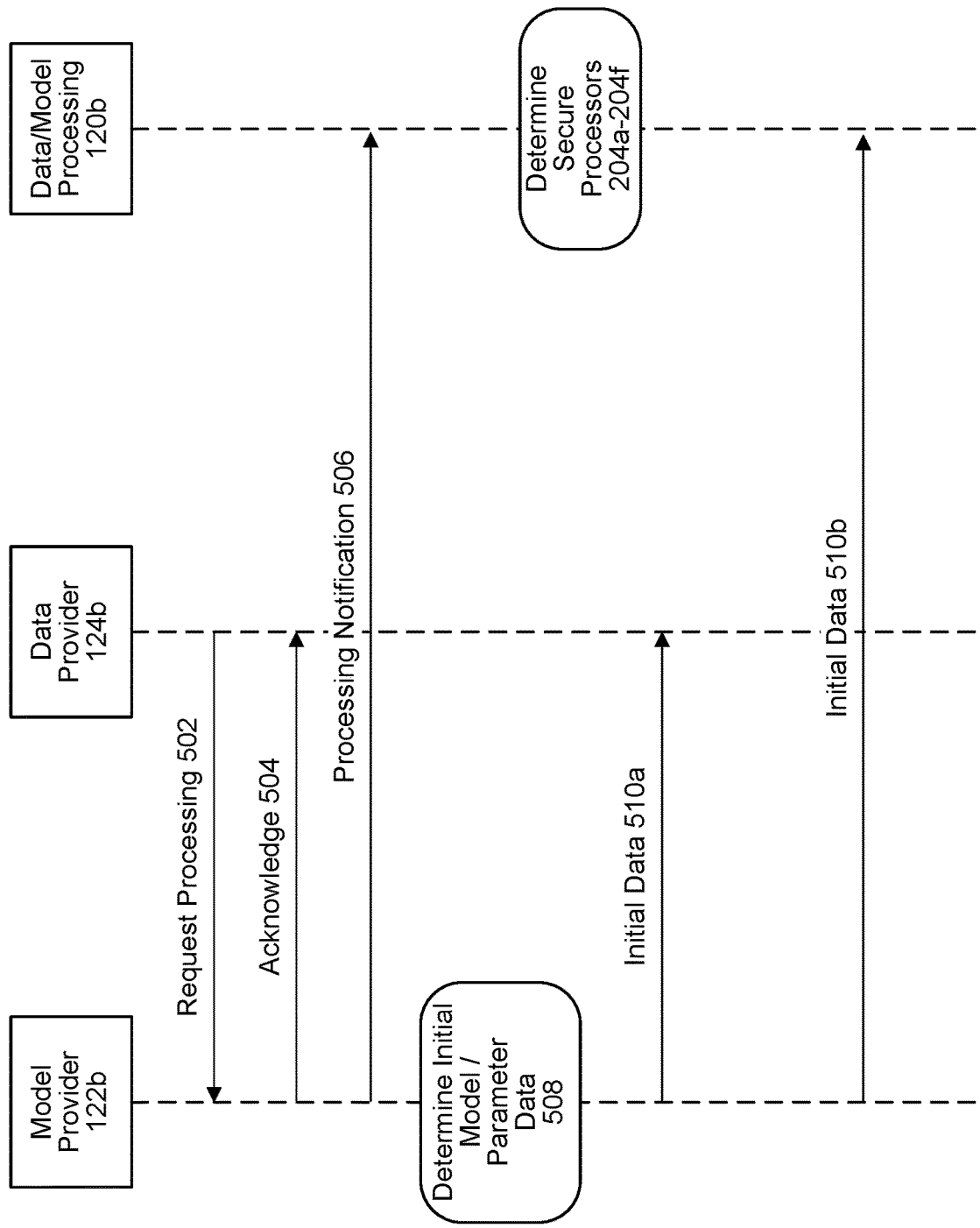

FIGS. 5A, 5B, 5C, 5D, and 5E illustrate processes for securely processing data according to embodiments of the present disclosure. Referring first to FIG. 5A, as described above with reference to FIG. 4A, a data-provider system 124b may send (502), to a model-provider system 122b, a request to begin processing, and the model-provider system 504 may send (504) an acknowledgement of that request. The model-provider system 122b may also send (506), to the data/model processing system 120b, a notification to determine five secure-processing components 204a-204e. The model-provider system 122 may determine (508) initial model/parameter data, which may be the input layer(s) 304, input layer(s) parameter data 306, the output layer(s) 310, and/or the output layer(s) parameter data 312, and may send (510a, 510b) corresponding initial data to the data provider system 124b and/or the data/model processing system 120b. A first secure-processing component 204a may be configured to perform homomorphic operations and may thus correspond to a sufficient level of computing resources to perform those operations. Second, third, fourth, and fifth secure-processing components 204b-204e may be configured to perform decryption, multiplication, and encryption operations, and may thus correspond to lesser computing resources than that of the first secure-processing component 204a.

Referring to FIG. 5B, the model-provider system 122b determines (520) public key data and corresponding private key data. The model-provider system 122b may then send (522a), to the data-provider system 124b, the public key data; may send (522b), to the first secure-processing component 204a, the public key data; may send (524b), to the second secure-processing component 204b, the public and private key data; may send (524c), to the third secure-processing component 204c, the public and private key data; may send (524d), to the fourth secure-processing component 204d, the public and private key data; and may send (524e), to the fifth secure-processing component 204e, the public and private key data. In some embodiments, instead of the model-provider system 122b, another secure-processing component 204f (different from the illustrated secure-processing components 204a-204e) may determine and send the public and private key data to the various recipients, as described above. In these embodiments, this other secure-processing component 204f may then be used to determine event data based at least in part on multiplication result data, as discussed below with reference to FIG. 5E.

Referring to FIG. 5C, the data-provider system 124a may determine (540) encrypted operand data $E(f_1)$ and $E(f_2)$. The values $f_1$ and $f_2$ may be any two floating-point numbers, and $E( )$ may be a homomorphic encryption function. The values $f_1$ and $f_2$ may represent numbers associated with evaluation of a model 128, such as input data 302 and/or input layer(s) parameter data 306. The values $f_1$ and $f_2$ may represent two of a sequence of numbers; the operations described herein may be repeated for any numbers of pairs of values $f_1$ and $f_2$. In some embodiments, the values of $f_1$ and $f_2$ represent elements of one or more vectors. Any source of the values $f_1$ and $f_2$ is, however, within the scope of the present disclosure.

The data-provider system 124a may further determine (542) random number data representing at least two random numbers $r_1$, $r_2$. The data-provider system 124b may further determine (544) encrypted random number data representing encrypted versions of the two random numbers $r_1$, $r_2$: $E(r_1)$ and $E(r_2)$. $E( )$ may be a homomorphic encryption function. The data-provider system 124b may further determine and send (546b-546e), to the secure-processing components 204b-204e, data in accordance with the below Table 1. In some embodiments, the data-provider system 124a may determine more than two random numbers; the more than two random numbers may be used to modify the values $f_1$ and $f_2$ and the result(s) may be sent to more than four secure-processing components 204.

TABLE 1

| First Value | Second Value | Recipient |
| --- | --- | --- |
| $E(f_1) + E(r_1)$ | $E(f_2) + E(r_2)$ | Second Secure Processor 204b |
| $E(f_1) + E(r_1)$ | $-E(r_2)$ | Third Secure Processor 204c |
| $-E(r_1)$ | $E(f_2) + E(r_2)$ | Fourth Secure Processor 204d |
| $E(r_1)$ | $E(r_2)$ | Fifth Secure Processor 204e |

Figure 5D:
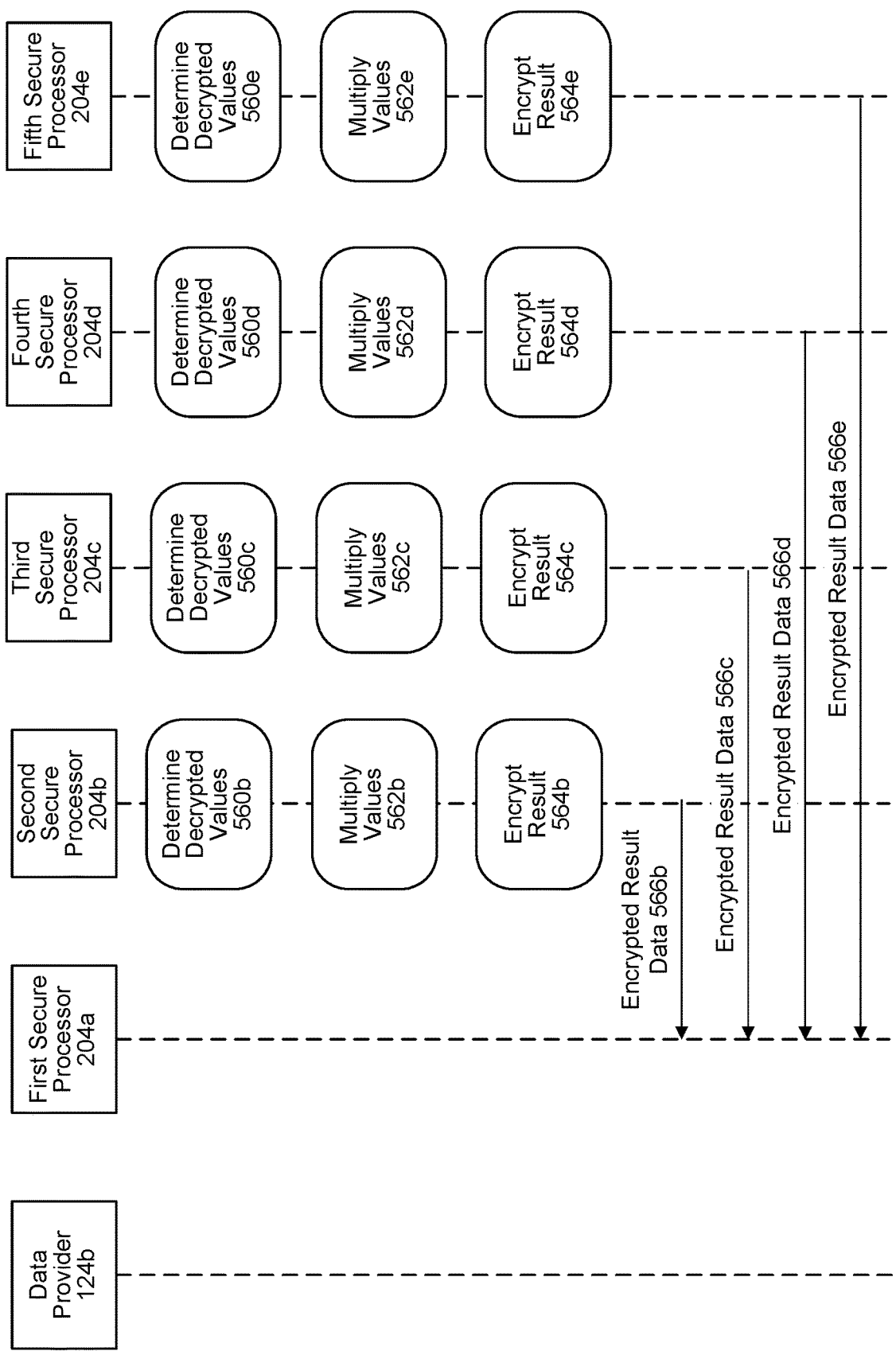

Referring to FIG. 5D, each of the secure-processing components 204b-204e may determine (560b-560e) decrypted values for each of the pair of received values in accordance with an encryption function $E^{-1}( )$ corresponding to the encryption function $E( )$. Each of the secure-processing components 204b-204e may multiply (562b-562e) the decrypted values with each other to determine multiplication result data. Each of the secure-processing components 204b-204e may then determine (564b-564e) encrypted values for each its corresponding multiplication result data. Each of the secure processors 204b-204e may send (566b-566e) the encrypted multiplication result data to the first secure-processing component 204a.

Referring to FIG. 5E, the first secure-processing component 204a may then determine (580) the sum of the received encrypted multiplication result data using, for example, a homomorphic addition operation of the above-described results of the multiplications 562b, 562c, 562d, 562e. This sum may represent the result of the multiplication $E(f_1 \times f_2)$, which the first secure-processing component 204a may send (582) to the model-provider system 122b. The model-provider system 122b may then determine (584) event data, using at least one layer of the model 128, based at least in part on the result of the multiplication $E(f_1 \times f_2)$. That is, the result of the multiplication $E(f_1 \times f_2)$ may be used in determining output data 314 from input data 302, though other operations may also be used in determining the output data 314. In other embodiments, the model-provider system 122b and/or the first secure processing component 204a may send the result of the multiplication $E(f_1 \times f_2)$ to another secure processing component 204f; the model-provider system 122b may, in these embodiments, also send one or more layers of the model 128 to the other secure processing component 204f. This other secure-processing component 204f may thus instead or in addition process the result of the multiplication $E(f_1 \times f_2)$ to determine event data, using at least one layer of the model 128, which it may send (586) to the data-provider system 124b.

As mentioned above with reference to Equation (19), an integer value $u_i$ may be expressed as a sum of 16-bit blocks, and $u_i$ may be defined as a set of values $<u_{ij}>$, where $u_{ij}$ is the value for each 16-bit block, thus permitting the processing of integers and fixed-point numbers having sizes greater than 32. As shown below in Equation (33), the block size 16 may be generalized as a block size of n, wherein n is any integer, and $-2^{n-1} \leq u_{ij} \leq 2^{n-1}-1$.

$$u_i = \sum_j \frac{u_{ij}}{2^{nj}} \quad (33)$$

If the value of n is less than 16, $u_{ij}$ may be extended using a number of zeroes for its most-significant digits. For example, the value of 123.45 may be extended to 00000123.45. Given two fixed-point decimal numbers $f_1, f_2$ with scales $s_1, s_2$ (e.g., a number of digits), the product $f_1 \times f_2$ has a scale of $s_1+s_2$. Therefore, instead of a using common scale for all fixed-point decimal numbers, to support multiplication, each fixed-point decimal number $f_i$ may have its own scale as shown below in Equation (34).

$$f_i = \frac{u_i}{10^{s_i}} \quad (34)$$

The values of $f_1, f_2$ may thus be multiplied in accordance with the below Equation (35), in which the first value $f_1$ is encrypted and the second value $f_2$ is not encrypted.

$$f_1 \times f_2 = \Sigma_{j+k=d} u_{1j} \times u_{2k}, \text{scale } s_1+s_2 \quad (35)$$

In the above Equation (34), each to $u_{1j} \times u_{2k}$ may be computed in O(log(d)) time using, for example, a double-and-add multiplication as described herein. Values $f_i$ having different scales may be operated on by aligning all the values $f_i$ to the same scale max(s), in accordance with Equation (36) below.

$$f, \text{scale } s = f \times 10^{s'}, \text{scale } s+s' \quad (36)$$

In computing the dot product of two vectors $f$ and $g$, if $f$ and $g$ have the same scale $s$, the result of the dot-product operation has a scale $2s$, which may be scaled back to $s$ after decryption. The maximum length of the vectors $f$ and $g$ may be expressed by the below equation (37), in which m is the step size in a baby-step-giant-step algorithm, as defined herein, and k is the maximum number of n-bit blocks in components of g.

$$\max = \frac{m^2}{2 \times (2^n - 1)^2 \times k} \quad (37)$$

For example, if $m=2_{16}$, n=4, and k=8, the max length off and g is 1,193,046.

As mentioned above, a neural network may be trained to perform some or all of the computational tasks described herein. The neural network, which may include input layer(s) 304 and/or output layer(s) 310 may include nodes within the input layer(s) 304 and/or output layer(s) 310 that are further organized as an input layer, one or more hidden layers, and an output layer. The input layer of each of the input layer(s) 304 and/or output layer(s) 310 may include m nodes, the hidden layer(s) may include n nodes, and the output layer may include o nodes, where m, n, and o may be any numbers and may represent the same or different numbers of nodes for each layer. Each node of each layer may include computer-executable instructions and/or data usable for receiving one or more input values and for computing an output value. Each node may further include memory for storing the input, output, or intermediate values. One or more data structures, such as a long short-term memory (LSTM) cell or other cells or layers may additionally be associated with each node for purposes of storing different values. Nodes of the input layer may receive input data, and nodes of the output layer may produce output data. In some embodiments, the input data corresponds to data from a data source, and the outputs correspond to model output data. Each node of the hidden layer may be connected to one or more nodes in the input layer and one or more nodes in the output layer. Although the neural network may include a single hidden layer, other neural networks may include multiple middle layers; in these cases, each node in a hidden layer may connect to some or all nodes in neighboring hidden (or input/output) layers. Each connection from one node to another node in a neighboring layer may be associated with a weight or score. A neural network may output one or more outputs, a weighted set of possible outputs, or any combination thereof.

In some embodiments, a neural network is constructed using recurrent connections such that one or more outputs of the hidden layer of the network feeds back into the hidden layer again as a next set of inputs. Each node of the input layer connects to each node of the hidden layer(s); each node of the hidden layer(s) connects to each node of the output layer. In addition, one or more outputs of the hidden layer(s) is fed back into the hidden layer for processing of the next set of inputs. A neural network incorporating recurrent connections may be referred to as a recurrent neural network (RNN). An RNN or other such feedback network may allow a network to retain a "memory" of previous states and information that the network has processed.

Processing by a neural network may be determined by the learned weights on each node input and the structure of the network. Given a particular input, the neural network determines the output one layer at a time until the output layer of the entire network is calculated. Connection weights may be initially learned by the neural network during training, where given inputs are associated with known outputs. In a set of training data, a variety of training examples are fed into the network. As examples in the training data are processed by the neural network, an input may be sent to the network and compared with the associated output to determine how the network performance compares to the target performance. Using a training technique, such as backpropagation, the weights of the neural network may be updated to reduce errors made by the neural network when processing the training data.

The model(s) discussed herein may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by decision boundaries. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, may require establishing a "ground truth" for the training examples. In machine learning, the term "ground truth" refers to an expert-defined label for a training example. Machine learning algorithms may use datasets that include "ground truth" information to train a model and to assess the accuracy of the model. Various techniques may be used to train the models including backpropagation, statistical learning, supervised learning, semi-supervised learning, stochastic learning, stochastic gradient descent, or other known techniques. Thus, many different training examples may be used to train the classifier(s)/model(s) discussed herein. Further, as training data is added to, or otherwise changed, new classifiers/models may be trained to update the classifiers/models as desired. The model may be updated by, for example, back-propagating the error data from output nodes back to hidden and input nodes; the method of backpropagation may include gradient descent.

In some embodiments, the trained model is a deep neural network (DNN) that is trained using distributed batch stochastic gradient descent; batches of training data may be distributed to computation nodes where they are fed through the DNN in order to compute a gradient for that batch. The secure processor 204 may update the DNN by computing a gradient by comparing results predicted using the DNN to training data and back-propagating error data based thereon. In some embodiments, the DNN includes additional forward pass targets that estimate synthetic gradient values and the secure processor 204 updates the DNN by selecting one or more synthetic gradient values.

FIG. 6 is a block diagram illustrating a computing environment that includes a server 600; the server 600 may be the data/model processing system 120*a*/120*b*, model-provider system 122*a*/122*b*, and/or data-provider system 124*a*/124*b*. The server 600 may include one or more input/output device interfaces 602 and controllers/processors 604. The server 600 may further include storage 606 and a memory 608. A bus 610 may allow the input/output device interfaces 602, controllers/processors 604, storage 606, and memory 608 to communicate with each other; the components may instead or in addition be directly connected to each other or be connected via a different bus.

A variety of components may be connected through the input/output device interfaces 602. For example, the input/output device interfaces 602 may be used to connect to the network 170. Further components include keyboards, mice, displays, touchscreens, microphones, speakers, and any other type of user input/output device. The components may further include USB drives, removable hard drives, or any other type of removable storage.

The controllers/processors 604 may processes data and computer-readable instructions and may include a general-purpose central-processing unit, a specific-purpose processor such as a graphics processor, a digital-signal processor, an application-specific integrated circuit, a microcontroller, or any other type of controller or processor. The memory 608 may include volatile random access memory (RAM), non-volatile read only memory (ROM), non-volatile magnetoresistive (MRAM), and/or other types of memory. The storage 606 may be used for storing data and controller/processor-executable instructions on one or more non-volatile storage types, such as magnetic storage, optical storage, solid-state storage, etc.

Computer instructions for operating the server 600 and its various components may be executed by the controller(s)/processor(s) 604 using the memory 608 as temporary "working" storage at runtime. The computer instructions may be stored in a non-transitory manner in the memory 608, storage 606, and/or an external device(s). Alternatively, some or all of the executable instructions may be embedded in hardware or firmware on the respective device in addition to or instead of software.

Figure 7:
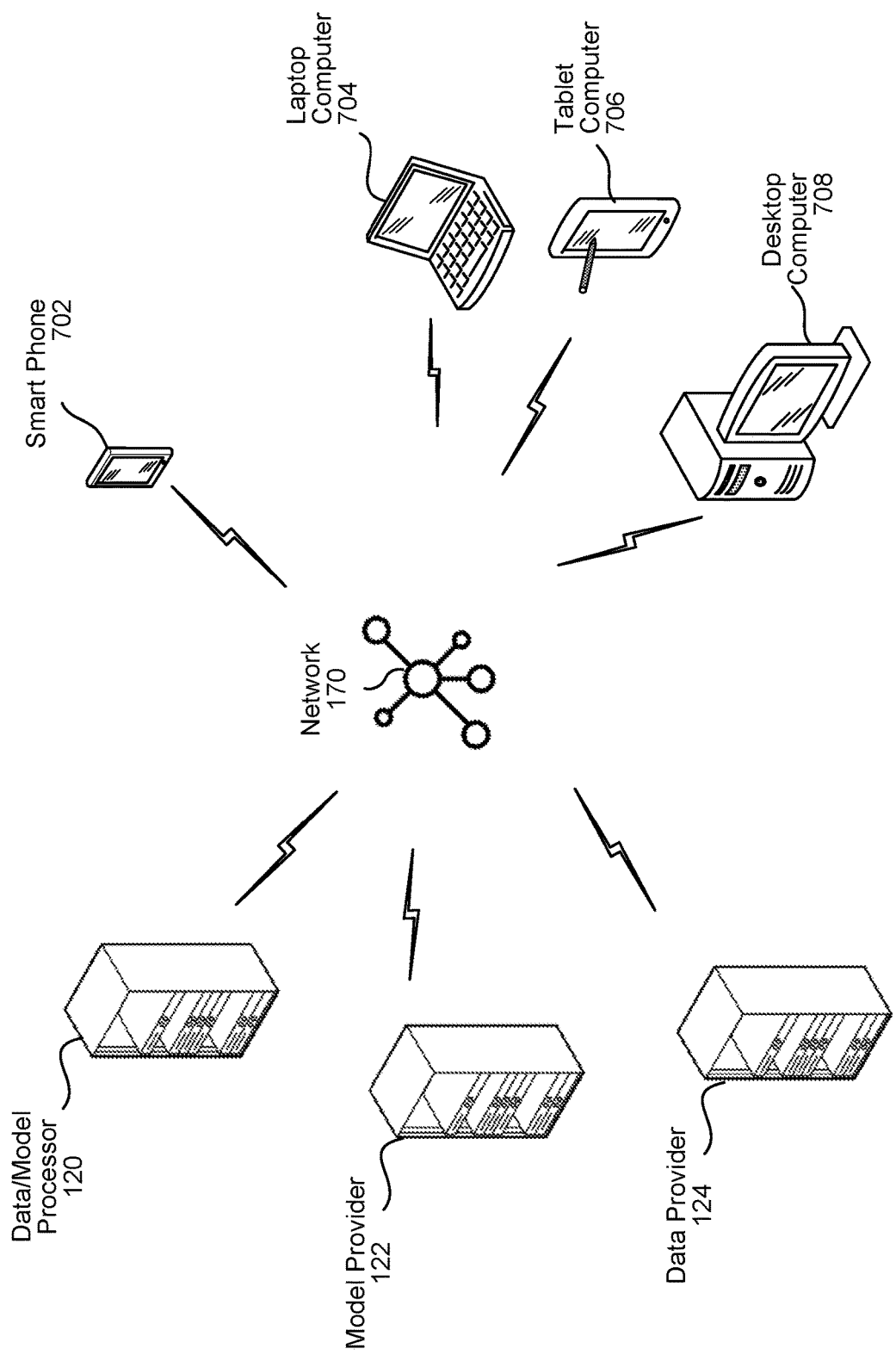
FIG. 7 illustrates a network according to embodiments of the present disclosure.

FIG. 7 illustrates a number of devices in communication with the data/model processing system 120*a*/120*b*, model-provider system 122*a*/122*b*, and/or data-provider system 124*a*/124*b* using the network 170*a*/170*b*. The devices may include a smart phone 702, a laptop computer 704, a tablet computer 706, and/or a desktop computer 708. These devices may be used to remotely access the data/model processing system 120*a*/120*b*, model-provider system 122*a*/122*b*, and/or data-provider system 124*a*/124*b* to perform any of the operations described herein.

In various embodiments, a computer-implemented method and/or system includes determining, by a first system, encrypted first input data and encrypted second input data, wherein at least one of the encrypted first input data and the encrypted second input data correspond to an event; determining, by the first system, an encrypted first random number and an encrypted second random number; determining, by the first system, first data representing a result of a first homomorphic operation corresponding to the encrypted first input data, the encrypted second input data, the encrypted first random number, or the encrypted second random number; sending, from the first system to a second system, the first data; decrypting, by the second system, the first data to determine a first number based at least in part on the encrypted first random number and a second number based at least in part on the encrypted second random number; multiplying, by the second system, the first number and the second number to determine second data; encrypting, by the second system, the second data to determine encrypted second data; determining, by the second system using a second homomorphic operation, a product of the encrypted first input data and the encrypted second input data based at least in part on the encrypted second data; and determining a prediction of the event based at least in part on the product.

The system and/or method may include adding, using a homomorphic addition operation, the encrypted first input data and the encrypted first random number; and adding, using the homomorphic addition operation, the encrypted second input data and the encrypted second random number. The system and/or method may include determining third data by adding the encrypted first input data and the encrypted first random number and by negating the encrypted second random number; determining fourth data by negation of the encrypted first random number and by adding the encrypted second input data and the encrypted second random number; and determining fifth data corresponding to the encrypted first random number and the encrypted second random number. The system and/or method may include receiving, by a first secure-processing component of the second system, the first data; and sending, by the first secure-processing component to a second secure-processing component of the second system, the encrypted second data.

The system and/or method may include receiving, by the second secure-processing component, the encrypted second data; and sending, by the second secure-processing component to a third system, an indication of the prediction. The encrypted first input data and encrypted second input data may correspond to operands of a dot-product operation. The system and/or method may include determining that the encrypted first input data corresponds to a first scale; determining that the encrypted second input data corresponds to a second scale different from the first scale; and modifying the encrypted first input data to correspond to the second scale. The encrypted first input data and encrypted second input data may correspond to elements of a vector.

The system and/or method may include determining public key data corresponding to a public encryption key; and determining private key data corresponding to a private encryption key, wherein decrypting the first data corresponds to the private key data and wherein encrypting the second data corresponds to the public key data. The system and/or method may include determining a first random number and a second random number; encrypting, using the private key data, the first random number; and encrypting, using the private key data, the second random number.

In various embodiments, a computer-implemented method and/or system may include processing, by a first system using an input layer of a neural-network model, first input data to determine first feature data, the input layer corresponding to first neural-network parameters; receiving, by the first system, encrypted second neural-network parameters corresponding to an output layer of the neural-network model; processing, by the first system using a multiplication operation corresponding to a dot-product, the first feature data and the encrypted second neural-network parameters to determine encrypted multiplication data; sending, from the first system to a second system, the encrypted multiplication data; decrypting, by the second system, the encrypted multiplication data to determine multiplication data; determining, using the output layer of the neural-network model and based at least in part on the multiplication data, event data corresponding to the first input data; and sending, from the second system to the first system, the event data.

The system and/or method may include determining an encrypted first random number and an encrypted second random number; determining first data representing a result of a first homomorphic operation corresponding to the first feature data, the encrypted second neural-network parameters, the encrypted first random number, or the encrypted second random number; and sending, to a first secure-processing component, the first data; and receiving, from a first secure-processing component, the encrypted multiplication data. The system and/or method may include selecting, by a third system, the neural-network model; and sending, from the third system to the first system, parameter data corresponding to the input layer. The system and/or method may include determining second neural-network parameters corresponding to an output layer of the neural-network model; and encrypting the second neural-network parameters to determine the encrypted second neural-network parameters.

The system and/or method may include determining a first scale corresponding to the first feature data; determining a second scale corresponding to the encrypted second neural-network parameters; and determining that the first scale equals the second scale. The system and/or method may include receiving, by a first secure-processing component, the multiplication data; processing, using an activation layer of the first secure-processing component, the multiplication data to determine activated data; and sending, from the first secure-processing component to a second secure-processing component, the activated data.

The system and/or method may include receiving, by the second secure-processing component, the activated data; and processing, by the second secure-processing component using an output layer of the neural-network model, the activated data to determine the event data. The event data may correspond to failure of a component corresponding to the first system and wherein the first input data corresponds to operational data corresponding to the component. The system and/or method may include determining public key data corresponding to a public encryption key; and determining private key data corresponding to a private encryption key, wherein decrypting the encrypted multiplication data corresponds to the public key data.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and data processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   determining, by a first system, encrypted first input data from first input data and encrypted second input data from second input data, wherein at least one of the encrypted first input data and the encrypted second input data correspond to an event;
   determining, by the first system, an encrypted first random number and an encrypted second random number;
   determining, by the first system, first data representing a result of a first homomorphic operation using the encrypted first input data and the encrypted first random number;
   determining, by the first system, second data representing a result of a second homomorphic operation using the encrypted second input data and the encrypted second random number;
   sending, from the first system to a second system, the first data and the second data;
   decrypting, by the second system, the first data to determine a first number based at least in part on the encrypted first random number;
   decrypting, by the second system, the second data to determine a second number based at least in part on the encrypted second random number;
   multiplying, by the second system, the first number and the second number to determine third data;
   encrypting, by the second system, the third data to determine encrypted third data;
   determining, by the second system using a third homomorphic operation, an encrypted product of the first input data and the second input data based at least in part on the encrypted third data; and
   determining a prediction of the event based at least in part on the encrypted product.

2. The computer-implemented method of claim 1, wherein determining the first data comprises adding, using a homomorphic addition operation, the encrypted first input data and the encrypted first random number; and
   wherein determining the second data comprises adding, using the homomorphic addition operation, the encrypted second input data and the encrypted second random number.

3. The computer-implemented method of claim 2, further comprising:
   determining fourth data by adding the encrypted first input data and the encrypted first random number and by negating the encrypted second random number;
   determining fifth data by negation of the encrypted first random number and by adding the encrypted second input data and the encrypted second random number; and
   determining sixth data corresponding to the encrypted first random number and the encrypted second random number.

4. The computer-implemented method of claim 1, further comprising:
   receiving, by a first secure-processing component of the second system, the first data; and
   sending, by the first secure-processing component to a second secure-processing component of the second system, the encrypted third data.

5. The computer-implemented method of claim 4, further comprising:
   receiving, by the second secure-processing component, the encrypted third data; and
   sending, by the second secure-processing component to a third system, an indication of the prediction.

6. The computer-implemented method of claim 1, wherein the encrypted first input data and the encrypted second input data correspond to operands of a dot-product operation.

7. The computer-implemented method of claim 1, further comprising:
   determining that the encrypted first input data corresponds to a first scale;
   determining that the encrypted second input data corresponds to a second scale different from the first scale; and
   modifying the encrypted first input data to correspond to the second scale.

8. The computer-implemented method of claim 1, wherein the encrypted first input data and the encrypted second input data correspond to elements of a vector.

9. The computer-implemented method of claim 1, further comprising:
   determining public key data corresponding to a public encryption key; and
   determining private key data corresponding to a private encryption key, wherein decrypting the first data corresponds to the private key data and wherein encrypting the third data corresponds to the public key data.

10. The computer-implemented method of claim 9, wherein determining the encrypted first random number and the encrypted second random number comprises:
    determining a first random number and a second random number;
    encrypting, using the private key data, the first random number; and
    encrypting, using the private key data, the second random number.

11. A system comprising:
    at least one processor; and
    at least one memory including instructions that, when executed by the at least one processor, cause the system to:
      determine, by a first system, encrypted first input data from first input data and encrypted second input data from second input data, wherein at least one of the encrypted first input data and the encrypted second input data correspond to an event;
      determine, by the first system, an encrypted first random number and an encrypted second random number;

determine, by the first system, first data representing a result of a first homomorphic operation using the encrypted first input data, data and the encrypted first random number;

determine, by the first system, second data representing a result of a second homomorphic operation using the encrypted second input data and the encrypted second random number;

send, from the first system to a second system, the first data and the second data;

decrypt, by the second system, the first data to determine a first number based at least in part on the encrypted first random number, decrypt, by the second system, the second data to determine a second number based at least in part on the encrypted second random number;

multiply, by the second system, the first number and the second number to determine third data;

encrypt, by the second system, the third data to determine encrypted third data;

determine, by the second system using a third homomorphic operation, an encrypted product of the first input data and the second input data based at least in part on the encrypted third data; and determine a prediction of the event based at least in part on the encrypted product.

12. The system of claim 11, wherein the at least one memory further includes instructions, that, when executed by the at least one processor, further cause the system to:
add, using a homomorphic addition operation, the encrypted first input data and the encrypted first random number; and
add, using the homomorphic addition operation, the encrypted second input data and the encrypted second random number.

13. The system of claim 12, wherein the at least one memory further includes instructions, that, when executed by the at least one processor, further cause the system to:
determine fourth data by adding the encrypted first input data and the encrypted first random number and by negating the encrypted second random number;
determine fifth data by negation of the encrypted first random number and by adding the encrypted second input data and the encrypted second random number; and
determine sixth data corresponding to the encrypted first random number and the encrypted second random number.

14. The system of claim 11, wherein the at least one memory further includes instructions, that, when executed by the at least one processor, further cause the system to:
receive, by a first secure-processing component of the second system, the first data; and
send, by the first secure-processing component to a second secure-processing component of the second system, the encrypted third data.

15. The system of claim 14, wherein the at least one memory further includes instructions, that, when executed by the at least one processor, further cause the system to:
receive, by the second secure-processing component, the encrypted third data; and
send, by the second secure-processing component to a third system, an indication of the prediction.

16. The system of claim 11, wherein the encrypted first input data and the encrypted second input data correspond to operands of a dot-product operation.

17. The system of claim 11, wherein the at least one memory further includes instructions, that, when executed by the at least one processor, further cause the system to:
determine that the encrypted first input data corresponds to a first scale;
determine that the encrypted second input data corresponds to a second scale different from the first scale; and
modify the encrypted first input data to correspond to the second scale.

18. The system of claim 11, wherein the encrypted first input data and the encrypted second input data correspond to elements of a vector.

19. The system of claim 11, wherein the at least one memory further includes instructions, that, when executed by the at least one processor, further cause the system to:
determine public key data corresponding to a public encryption key; and
determine private key data corresponding to a private encryption key,
wherein decrypting the first data corresponds to the private key data and wherein encrypting the third data corresponds to the public key data.

20. The system of claim 19, wherein the at least one memory further includes instructions, that, when executed by the at least one processor, further cause the system to:
determine a first random number and a second random number;
encrypt, using the private key data, the first random number; and
encrypt, using the private key data, the second random number.

* * * * *